United States Patent
Page et al.

(10) Patent No.: US 11,888,196 B2
(45) Date of Patent: Jan. 30, 2024

(54) SELF-REFUELING POWER-GENERATING SYSTEMS

(71) Applicant: HYDROLITE LTD, Caesarea (IL)

(72) Inventors: Miles Page, Hod Hasharon (IL); Ervin Tal-Gutelmacher, Hod Hasharon (IL)

(73) Assignee: HYDROLITE LTD, Caesarea (IL)

( * ) Notice: Subject to any disclaimer, the term of this patent is extended or adjusted under 35 U.S.C. 154(b) by 0 days.

(21) Appl. No.: 18/075,490

(22) Filed: Dec. 6, 2022

(65) Prior Publication Data

US 2023/0098124 A1    Mar. 30, 2023

Related U.S. Application Data

(63) Continuation-in-part of application No. PCT/IL2022/050590, filed on Jun. 2, 2022, and a
(Continued)

(30) Foreign Application Priority Data

Nov. 6, 2022 (IL) .......................................... 297987

(51) Int. Cl.
  *H01M 8/04* (2016.01)
  *H01M 8/0656* (2016.01)
  (Continued)

(52) U.S. Cl.
  CPC ....... *H01M 8/0656* (2013.01); *H01M 4/8807* (2013.01); *H01M 8/04291* (2013.01); *H01M 8/249* (2013.01)

(58) Field of Classification Search
  CPC ............. H01M 8/0656; H01M 4/8807; H01M 8/04291
  See application file for complete search history.

(56) References Cited

U.S. PATENT DOCUMENTS 3,799,811 A    3/1974 Sampson et al.
2007/0116996 A1*   5/2007 Pavlik ................. H01M 8/2457
                                                    429/513
(Continued)

FOREIGN PATENT DOCUMENTS

CN    102185327 A    9/2011
CN    107546401 A    1/2018
(Continued)

OTHER PUBLICATIONS

International Search Report for PCT Application No. PCT/IL2022/050590, dated Aug. 28, 2022.
(Continued)

*Primary Examiner* — Olatunji A Godo
(74) *Attorney, Agent, or Firm* — PEARL COHEN ZEDEK LATZER BARATZ LLP

(57) ABSTRACT

Self-refueling power-generating systems and methods of configuring them are provided, which enable operation in a self-sustained manner, using no external resource for water, oxygen or hydrogen. The systems and methods determine the operation of reversible device(s) in fuel cell or electrolyzer mode according to power requirements and power availability, supply oxygen in a closed circuit, compressing received oxygen in the electrolyzer mode, and supplying water or dilute electrolyte in a closed circuit in conjunction with the closed oxygen supply circuit by separating oxygen produced by the reversible device(s) in the electrolyzer mode from the water or dilute electrolyte received from the reversible device(s). Membrane assemblies may comprise a binder and be hot-pressed to enhance their long-term performance and durability.

19 Claims, 15 Drawing Sheets

Related U.S. Application Data continuation-in-part of application No. 17/830,424, filed on Jun. 2, 2022.

(60) Provisional application No. 63/221,035, filed on Jul. 13, 2021, provisional application No. 63/211,186, filed on Jun. 16, 2021.

(51) Int. Cl.
*H01M 4/88* (2006.01)
*H01M 8/04291* (2016.01)
*H01M 8/249* (2016.01)

(56) References Cited

U.S. PATENT DOCUMENTS

| | | |
|---|---|---|
| 2008/0096059 A1 | 4/2008 | Kanie |
| 2013/0108939 A1 | 5/2013 | Besse et al. |
| 2013/0146471 A1 | 6/2013 | Dubois et al. |
| 2014/0093795 A1* | 4/2014 | Sone .............. H01M 8/186 429/418 |
| 2014/0120431 A1 | 5/2014 | Roelofs et al. |
| 2015/0129429 A1 | 5/2015 | Cherchi et al. |
| 2015/0349368 A1 | 12/2015 | Arges et al. |
| 2018/0002807 A1 | 1/2018 | Debe et al. |
| 2020/0099061 A1* | 3/2020 | Price .................. C25B 9/23 |
| 2020/0220185 A1 | 7/2020 | Ma et al. |
| 2020/0313215 A1 | 10/2020 | Page et al. |
| 2021/0028465 A1 | 1/2021 | Dresp et al. |
| 2021/0066741 A1 | 3/2021 | Park et al. |
| 2022/0181643 A1* | 6/2022 | Martinez-Bonastre .............. H01M 4/926 |
| 2023/0098124 A1 | 3/2023 | Page et al. |

FOREIGN PATENT DOCUMENTS

| | | |
|---|---|---|
| CN | 108110284 A | 6/2018 |
| CN | 113549956 A | 10/2021 |
| EP | 3054519 A1 | 10/2016 |
| FR | 2926092 A1 | 7/2009 |
| TW | 201424113 A | 6/2014 |
| WO | WO2012044273 A1 | 4/2012 |
| WO | WO2022/157777 A1 | 7/2022 |

OTHER PUBLICATIONS

Ding, J., et al. "A novel nanofiltration membrane inspired by an asymmetric porous membrane for selective fractionation of monovalent anions in electrodialysis." RSC advances, 8(53), 30502-30511 Ding, J., Yang, S., Pan, J., Zheng, Y., Sotto, A., & Shen, J., Aug. 31, 2018.

International Search Report of PCT Application No. PCT/IL2022/050091, dated Apr. 26, 2022.

Conde, J. et al. "Mass-transport properties of electrosprayed Pt/C catalyst layers for polymer-electrolyte fuel cells". Journal of Power Sources, 427, 250-259. Conde, J. J., Folgado, M. A., Ferreira-Aparicio, P., Chaparro, A. M., Chowdhury, A., Kusoglu, A. & Weber, A. Z. Dec. 31, 2019.

International Search Report of PCT Application No. PCT/IL2021/051524, dated Jan. 30, 2022.

Gao J, et al. "Self-assembly of surface-charged latex nanoparticles: a new route to the creation of continuous channels for ion conduction". Macromolecules, 38(14):5854-6. Gao J, Lee D, Yang Y, Holdcroft S, Frisken BJ. Jul. 12, 2005.

Office Action in U.S. Appl. No. 17/830,424, dated Oct. 2, 2023.
Office Action of U.S. Appl. No. 17/830,424, dated Oct. 2, 2023.

* cited by examiner

450

401 — Determining operation of the reversible device in the fuel cell mode or in the electrolyzer mode according to power requirements and power availability

252 — Optimizing the hydrogen-side catalyst layer and the oxidant-side catalyst layer to operate in both the fuel cell mode and the electrolyzer mode according to specified requirements

254 — Configuring the membrane assemblies to have the catalyst layers and the separation layer embedded in continuous polymerized ionomer material

256 — Configuring the separation layer to comprise at least one layer that includes surface-charged particles that have a surface excess of charges, imparting ion conductivity along that surface when hydrated

258 — Configuring the separation layer to have at least one protective layer adjacent to a respective one of the catalyst layers, to prevent dehydration thereof, and/or exposure to excessively oxidating or reducing conditions

460 — Supplying oxygen to the reversible device in a closed circuit, by supplying oxygen to the membrane assembly when operated in the fuel cell mode, and receiving and compressing oxygen from the membrane assembly when operated in the electrolyzer mode

470 — Supplying water or dilute electrolyte to the reversible device in a closed circuit, by supplying and receiving water or dilute electrolyte in conjunction with the closed oxygen supply circuit by separating oxygen produced by the reversible device in the electrolyzer stage from the water or dilute electrolyte received from the reversible device

*Figure 2C*

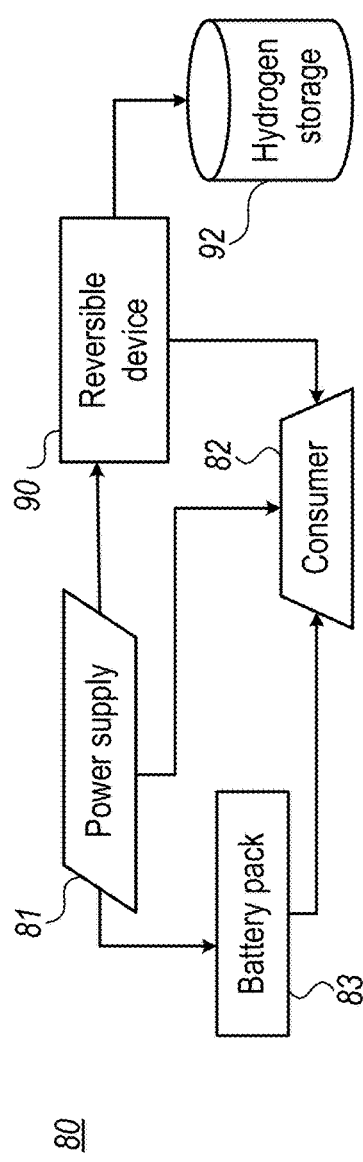
*Figure 4A - Prior Art*
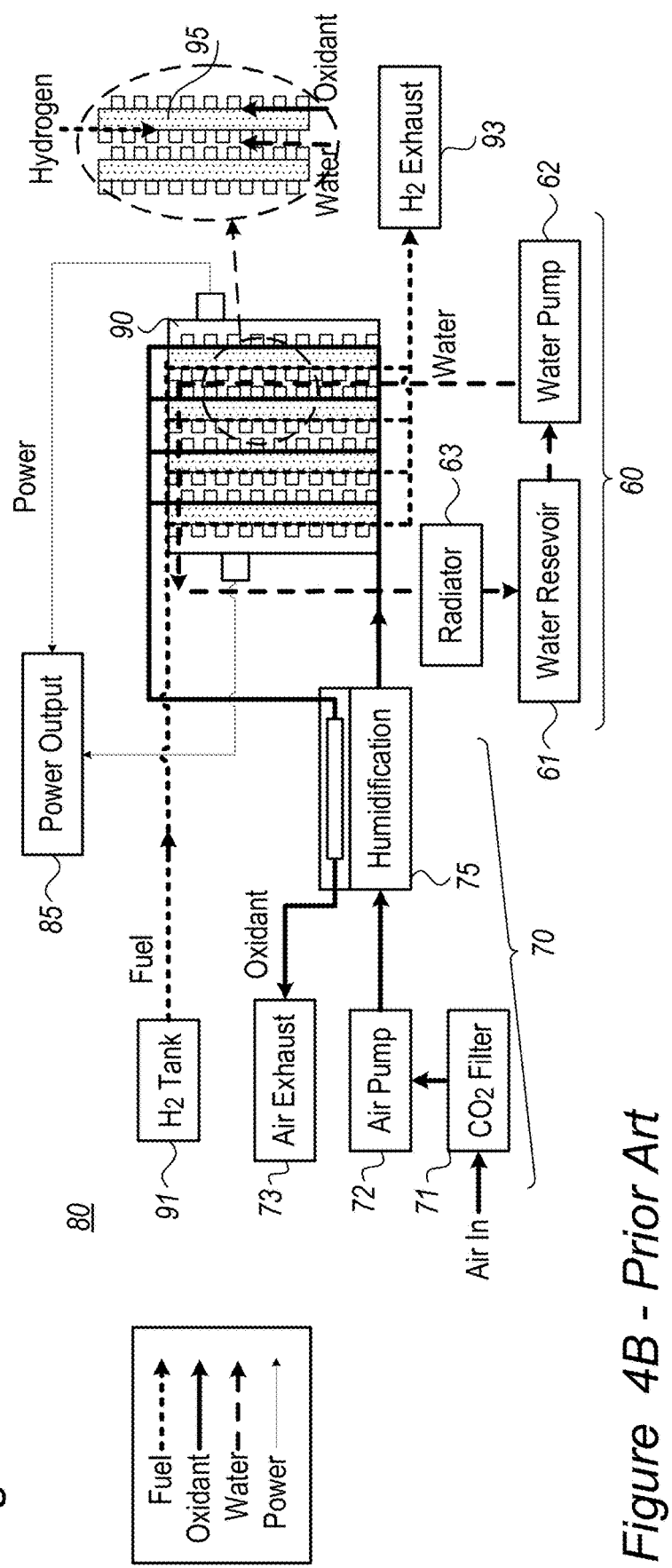
*Figure 4B - Prior Art*

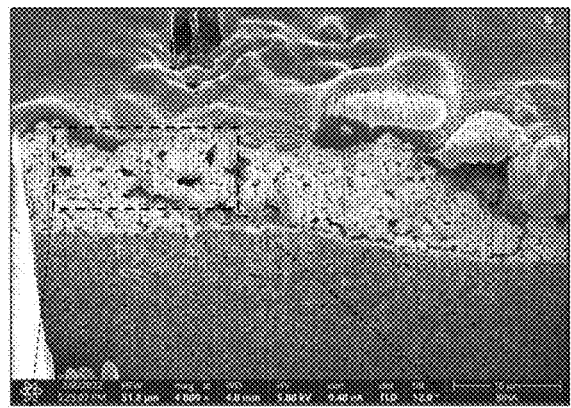
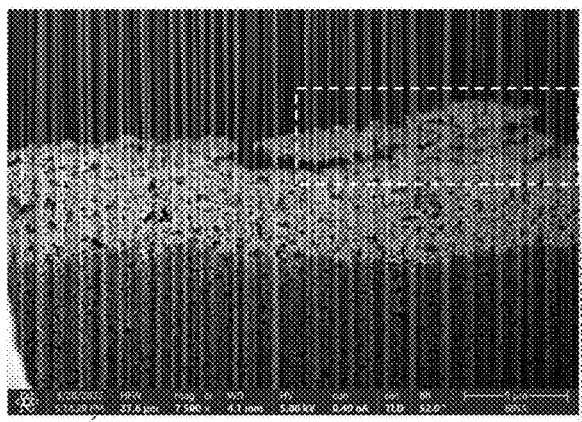
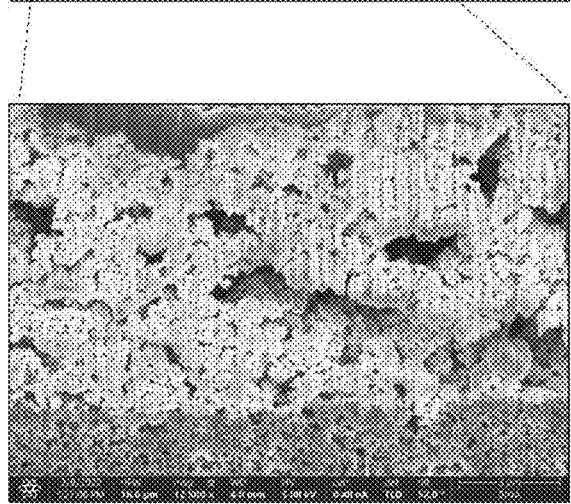
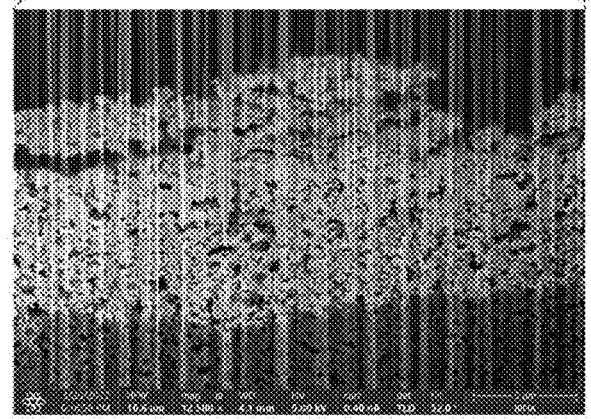
Figure 11C  Figure 11D

SELF-REFUELING POWER-GENERATING SYSTEMS

CROSS REFERENCE TO RELATED APPLICATIONS

This application is a Continuation-in-Part of U.S. patent application Ser. No. 17/830,424, filed Jun. 2, 2022, which claims the benefit of U.S. Provisional Application No. 63/211,186, filed on Jun. 16, 2021, and U.S. Provisional Application No. 63/221,035, filed on Jul. 13, 2021; this application is also a Continuation-in-Part of International Application No. PCT/IL2022/050590, filed on Jun. 2, 2022; and this application claims priority from Israeli Patent Application No. 297,987, filed on Nov. 6, 2022. The prior applications are incorporated herein by reference in their entirety.

BACKGROUND OF THE INVENTION

1. Technical Field

The present invention relates to the field of reversible electrochemical devices, and more particularly, to self-refueling power-generating systems and configurations of electrodes thereof.

2. Discussion of Related Art

The demand for self-sustained energy storage and supply system is large. Reversible systems based on fuel cell designs have been proposed (see, e.g., FIGS. 4A and 4B).

Electrolyzers and fuel cells are electrochemical devices that produce hydrogen and consume hydrogen to produce energy, respectively, which gain uses as alternative energy sources (fuel cells) and fuel sources (electrolyzers). Combined configurations provide independent sustainable energy sources that can regenerate their hydrogen supply.

U.S. Patent Application Publication No. 20130146471, which is incorporated herein by reference in its entirety, teaches a membrane-electrode assembly for use in a reversible fuel cell comprises an ion conductive membrane having first and second surfaces; a first electrocatalyst layer in contact with the first surface of the membrane, such first electrocatalyst layer comprising at least one discrete electrolysis-active area (ELE1 i) and at least one discrete energy generation-active area (EG1 i). A second electrocatalyst layer is placed in contact with the second surface of the membrane, such second electrocatalyst layer comprising at least one discrete electrolysis-active area (ELE2 i) and at least one discrete energy generation-active area (EG2 i). Each of the discrete electrolysis-active area(s) (ELE1 i) on the first electrocatalyst layer correspond and are aligned with each of the discrete electrolysis-active area(s) (ELE2 i) on the second electrocatalyst layer, and each of the discrete energy generation-active area(s) (EG1 i) on the first electrocatalyst layer correspond and are aligned with each of the discrete energy generation-active area(s) (EG2 i) on the second electrocatalyst layer.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a self-refueling power-generating system comprising: (i) a reversible device comprising a stack of electrochemical cells with respective membrane assemblies, the reversible device configured to be operated alternately as a fuel cell in a fuel cell mode and as an electrolyzer in an electrolyzer mode, wherein each of the membrane assemblies has a hydrogen-side catalyst layer configured to catalyze hydrogen oxidation in the fuel cell mode and to catalyze hydrogen formation in the electrolyzer mode and an oxidant-side catalyst layer configured to catalyze oxygen reduction in the fuel cell mode and to catalyze oxygen formation in the electrolyzer mode, the catalyst layers being separated by a separation layer, (ii) a controller configured to determine operation of the reversible device in the fuel cell mode or in the electrolyzer mode, (iii) a hydrogen unit configured to supply hydrogen to the reversible device when operated in the fuel cell mode, and receive and optionally compress hydrogen from the reversible device when operated in the electrolyzer mode, (iv) an oxidant unit configured to supply oxygen to the reversible device when operated in the fuel cell mode, and receive and optionally compress oxygen from the reversible device when operated in the electrolyzer mode, (v) a water unit configured to supply water or dilute electrolyte to the reversible device in a closed circuit and in conjunction with the supply of oxygen thereto, wherein the water unit comprises a gas/liquid separation module configured to deliver separated oxygen from the reversible device to the oxidant unit, and (vi) a power connection configured to receive power from the reversible device when operated in the fuel cell mode, and deliver power to the reversible device when operated in the electrolyzer mode, wherein the power connection is configured to deliver the received power to an external load when required, and to receive power for delivery from an external source when available.

One aspect of the present invention provides a method of configuring a power-generating system to be self-refueling and self-sustaining, wherein the power-generating system comprises a reversible device comprising a stack of electrochemical cells with respective membrane assemblies, the reversible device configured to be operated alternately as a fuel cell in a fuel cell mode and as an electrolyzer in an electrolyzer mode, wherein each of the membrane assemblies has a hydrogen-side catalyst layer configured to catalyze hydrogen oxidation in the fuel cell mode and to catalyze hydrogen formation in the electrolyzer mode and an oxidant-side catalyst layer configured to catalyze oxygen reduction in the fuel cell mode and to catalyze oxygen formation in the electrolyzer mode, the catalyst layers being separated by a separation layer, a hydrogen unit configured to supply hydrogen to the reversible device when operated in the fuel cell mode, and receive and optionally compress hydrogen from the reversible device when operated in the electrolyzer mode, and a power connection configured to receive power from the reversible device when operated in the fuel cell mode, and deliver power to the reversible device when operated in the electrolyzer mode, wherein the power connection is configured to deliver the received power to an external load when required, and to receive power for delivery from an external source when available. The method comprises (i) determining operation of the reversible device in the fuel cell mode or in the electrolyzer mode according to power requirements and power availability, (ii) supplying oxygen to the reversible device in a closed circuit, by supplying oxygen to the reversible device when operated in the fuel cell mode, and receiving and compressing oxygen from the reversible device when operated in the electrolyzer mode, and (iii) supplying water or dilute electrolyte to the reversible device in a closed circuit, by supplying and receiving water or dilute electrolyte in conjunction with the closed oxygen supply circuit by separating oxygen produced by the reversible device in the electrolyzer stage from the water or dilute electrolyte received from the reversible device.

One aspect of the present invention provides a self-refueling power-generating system comprising a reversible device that is operable in a fuel cell mode and in an electrolyzer mode, wherein: (i) hydrogen and oxygen are supplied and received from the reversible device in respective closed circuits, and are compressed in respective containers in the electrolyzer mode, and (ii) water or dilute electrolyte is supplied and received from the reversible device in a closed circuit that is in conjunction with the oxygen closed circuit, wherein the oxygen received from the reversible device is separated from the water or dilute electrolyte in a gas/liquid separation module.

One aspect of the present invention provides a method of preparing a gas diffusion electrode (GDE) for an electrochemical device, the method comprising: applying a mixture on a gas diffusion layer (GDL), wherein the mixture comprises a catalyst dispersion and a binder (e.g., Teflon) dispersion, and hot pressing the GDL to form the GDE.

One aspect of the present invention provides a gas diffusion electrode (GDE) for an electrochemical device, the GDE comprising: a gas diffusion layer (GDL), and a mixture comprising a catalyst dispersion and a binder dispersion, applied on the GDL, wherein the GDL with the applied mixture is hot pressed to form the GDE.

One aspect of the present invention provides an electrolyzer comprising the GDE (with carbon-based GDL) as a hydrogen evolution reaction (HER) electrode, and optionally the GDE (with metal-based GDL) as an oxygen evolution reaction (OER) electrode.

One aspect of the present invention provides a fuel cell comprising the GDE (with carbon-based GDL) as either or both of an oxygen reduction reaction (ORR) electrode and a hydrogen oxidation reaction (HOR) electrode thereof.

One aspect of the present invention provides a dual cell, operable alternately as an electrolyzer and as a fuel cell, comprising the GDE (with carbon-based GDL and ionomer) as a HER/HOR electrode and another GDE (with metal-based GDL and optionally ionomer) as a OER/ORR electrode thereof.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2C is a high-level flowchart illustrating a method of configuring a power-generating system to be self-refueling and self-sustaining, according to some embodiments of the invention.

FIGS. 4A and 4B are schematic illustrations of prior art systems that are alternately operable as a fuel cell and as an electrolyzer.

Figure 1:
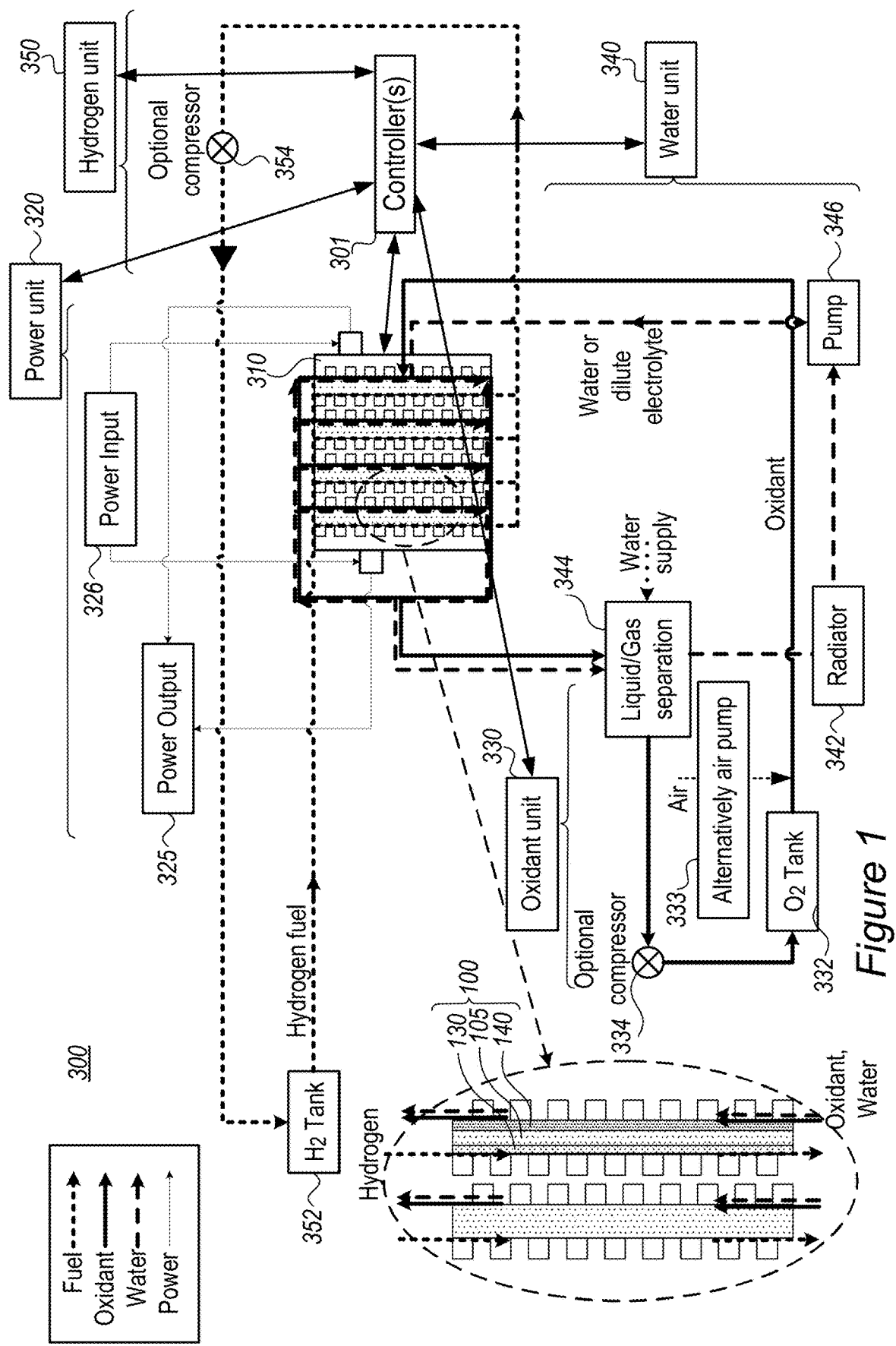
FIG. 1 is a high-level schematic illustration of a self-refueling power-generating system with reversible device(s), according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical methods and mechanisms for configuring and operating reversible fuel cell/electrolyzer systems and thereby provide improvements to the technological field of energy storage and delivery. Self-refueling power-generating systems and methods of configuring them are provided, which enable operation in a self-sustained manner, using no external resource for water, oxygen or hydrogen. The systems and methods determine the operation of reversible device(s) in fuel cell or electrolyzer mode according to power requirements and power availability, supply oxygen in a closed circuit, compressing received oxygen in the electrolyzer mode, and supplying water or dilute electrolyte in a closed circuit in conjunction with the closed oxygen supply circuit by separating oxygen produced by the reversible device(s) in the electrolyzer mode from the water or dilute electrolyte received from the reversible device(s).

Figure 2A:
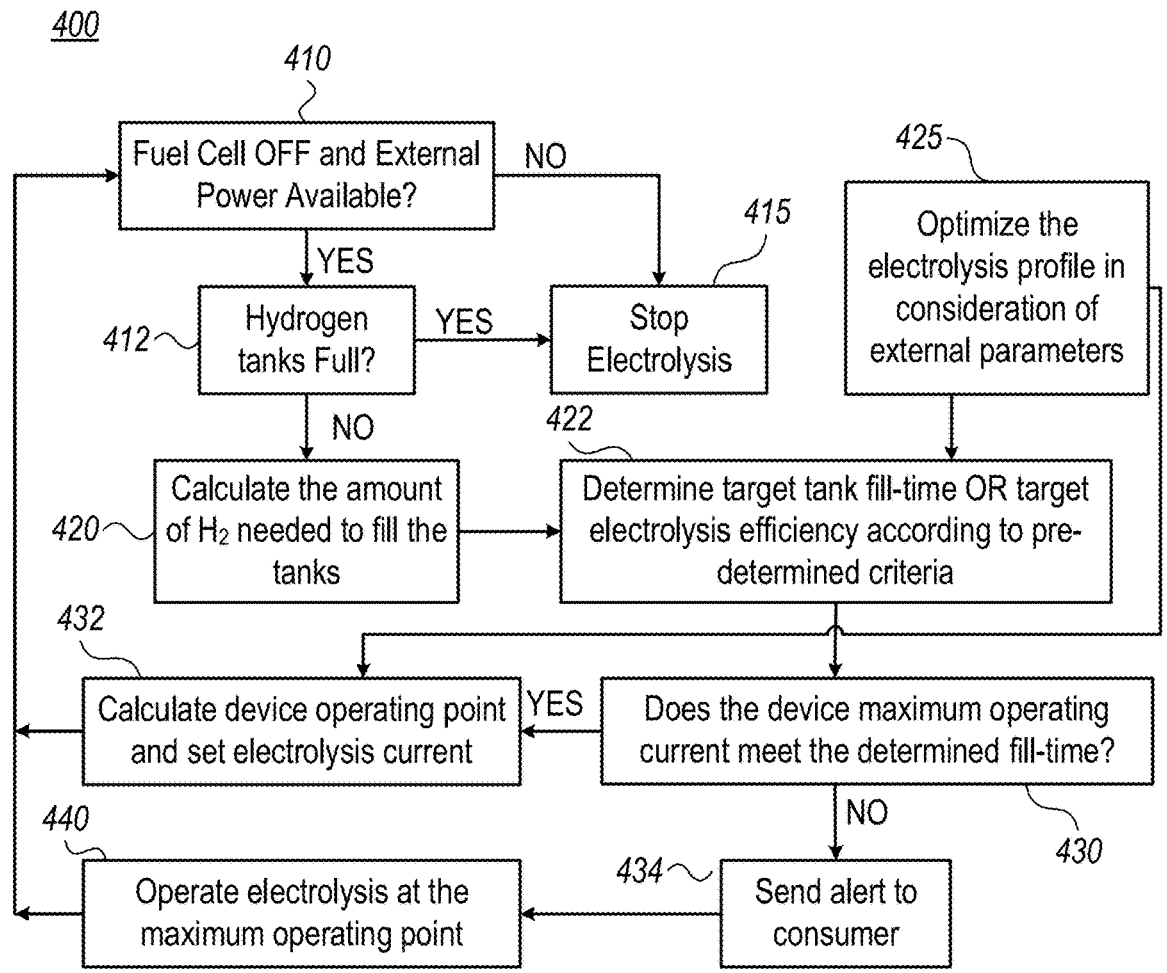
FIG. 2A is a high-level flowchart illustrating a method of operating self-refueling power-generating systems, according to some embodiments of the invention.
Figure 2B:
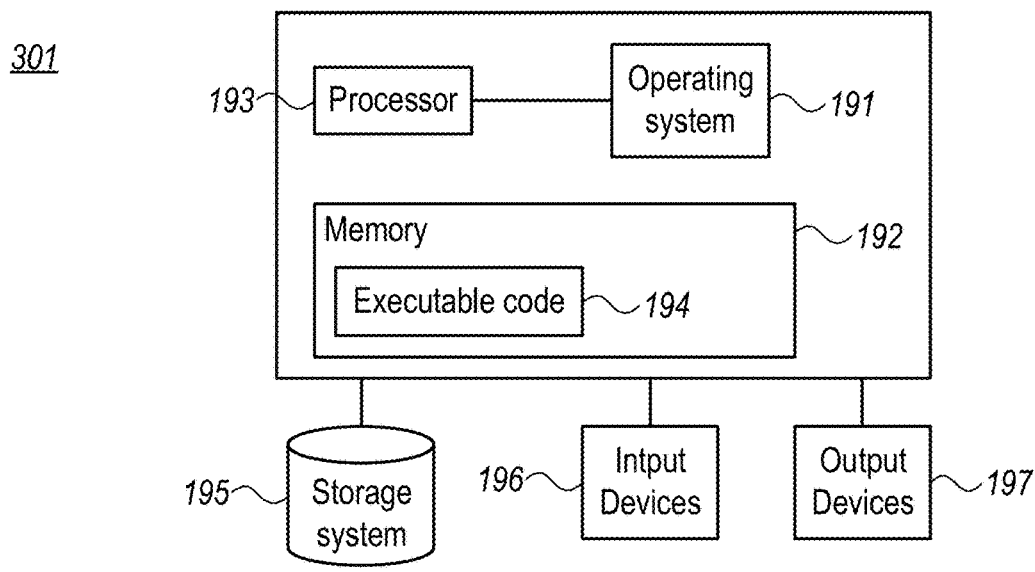
FIG. 2B is a high-level block diagram of exemplary controllers, which may be used with embodiments of the present invention.

FIG. 1 is a high-level schematic illustration of a self-refueling power-generating system 300 with reversible devices 310, according to some embodiments of the invention. FIG. 2A is a high-level flowchart illustrating a method 400 of operating self-refueling power-generating systems, according to some embodiments of the invention. FIG. 2B is a high-level block diagram of exemplary controllers 301, which may be used with embodiments of the present invention. FIG. 2C is a high-level flowchart illustrating a method 450 of configuring a power-generating system to be self-refueling and self-sustaining, according to some embodiments of the invention.

As illustrated schematically in FIG. 1, self-refueling power-generating system 300 comprises one or more reversible device 310 comprising a stack of one or more electrochemical cells with respective membrane assemblies 100. Reversible device 310 is configured to be operated alternately as a fuel cell in a fuel cell mode and as an electrolyzer in an electrolyzer mode (see FIG. 3A). Each of membrane assemblies 100 has a hydrogen-side (131) catalyst layer 130 configured to catalyze hydrogen oxidation in the fuel cell mode and to catalyze hydrogen formation (from water electrolysis) in the electrolyzer mode and an oxidant-side (141) catalyst layer 140 configured to catalyze oxygen reduction in the fuel cell mode and to catalyze oxygen formation (from water electrolysis) in the electrolyzer mode. Catalyst layers 130, 140 may be arranged in pairs and be separated by a separation layer 105 that allows ion transfer therethrough, anions in AEM configurations and protons in PEM configurations. Separation layer 105 may comprise a single layer, a composite layer, or multiple layers, each of which may be simple or composite, as disclosed below. System 300 further comprises one or more controller 301 configured to determine operation of reversible device 310 in the fuel cell mode or in the electrolyzer mode. FIG. 2B described below provides non-limiting examples for controller(s) 301. Schematic illustrations of operation of reversible device 310 in fuel cell mode 90A and in electrolyzer mode 90B are provided in FIG. 3A, followed by non-limiting examples for membrane assemblies 100 in FIGS. 3B-3D. The stack may comprise a single bifunctional stack with a plurality of electrochemical cells with respective membrane assemblies 100, that functions, as a single stack, in both fuel cell and electrolyzer operation modes. In various embodiments, the stack may comprise two, three, five, ten, twenty, fifty or more cells, or an intermediate number of cells.

Figure 3A:
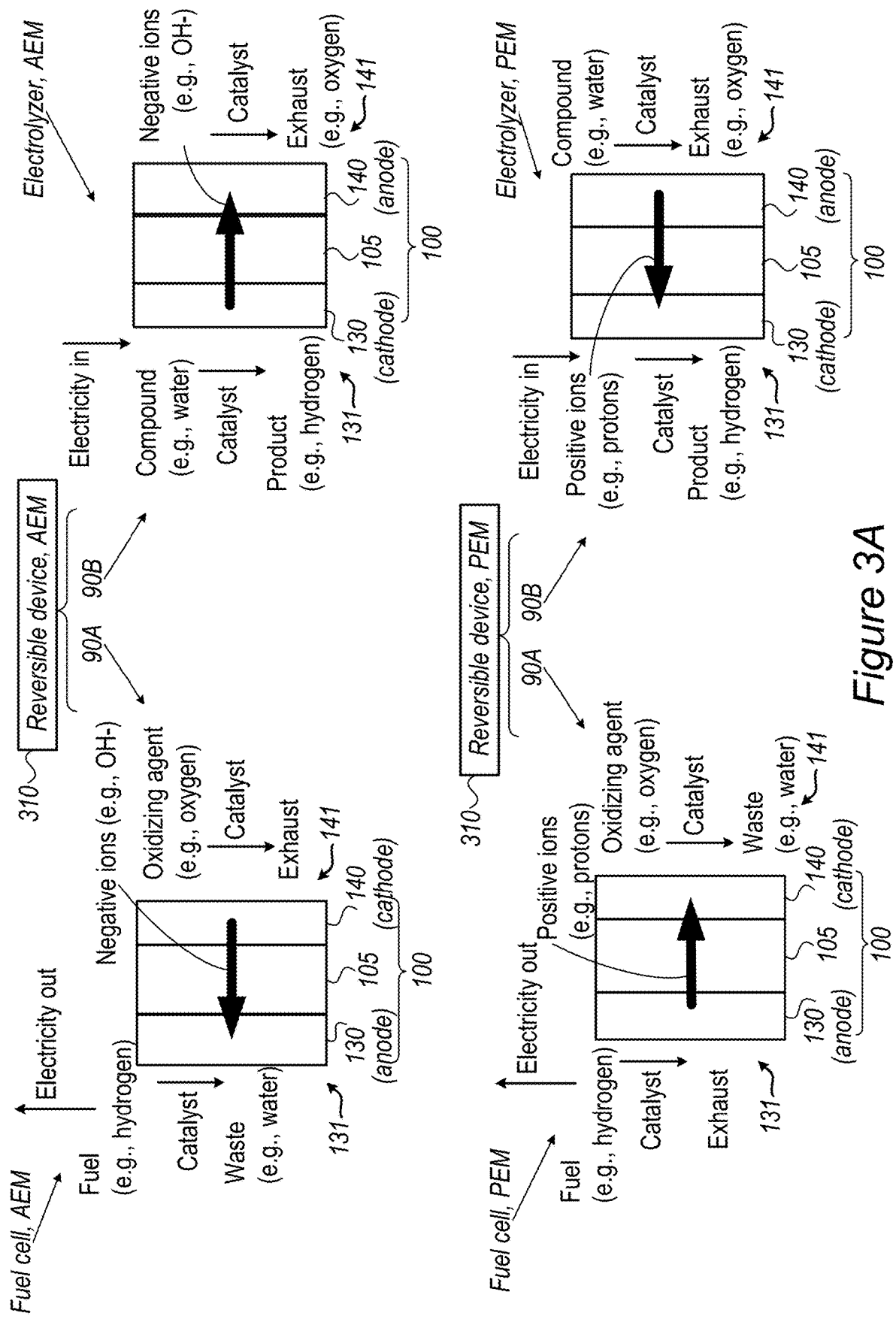
FIG. 3A is a high-level schematic illustration of the operation of reversible devices in fuel cell mode and in electrolyzer mode, according to some embodiments of the invention.
Figure 3B:
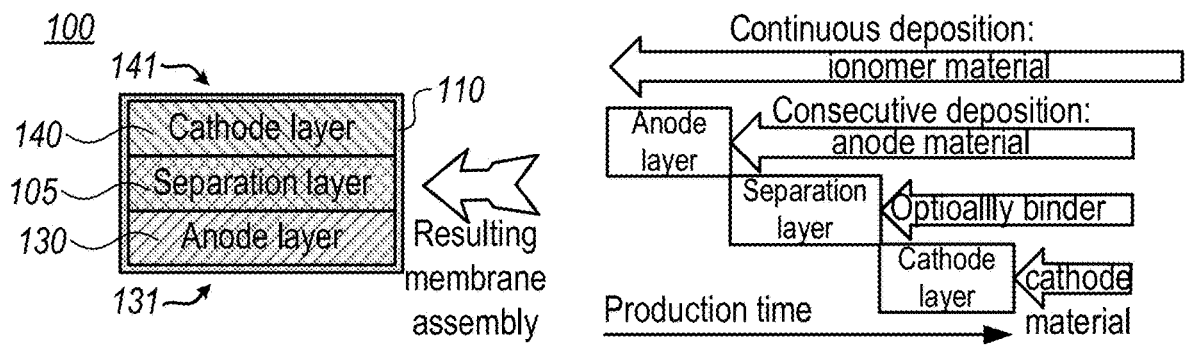
FIGS. 3B-3D provide non-limiting examples for membrane assemblies, according to some embodiments of the invention.
Figure 3C:
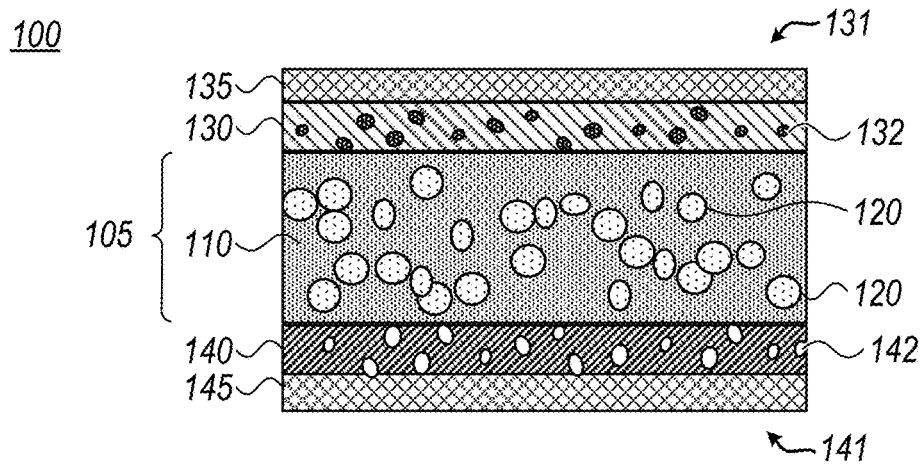
Figure 3D:
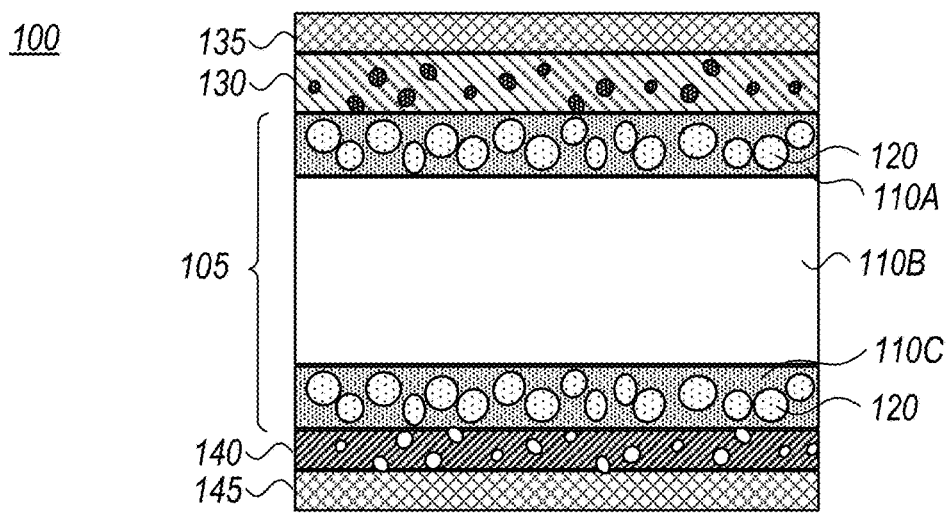

Membrane assemblies 100 may comprise single layered or multi-layered solid state polymer membranes, as illustrated schematically in FIGS. 3B-3D. For example, polymer membranes may be based on an ion-conducting polymer, and be able to transport water and anions and/or cations from one electrode to the other during operation. Membrane assemblies 100 may comprise (i) at least one catalyst layer comprising, on an oxygen side 141 of membrane assembly 100: oxygen generating catalyst layer(s), oxygen reducing catalyst layer(s) and/or bifunctional catalyst layer(s) capable of oxygen generation as well as oxygen reduction; and (ii) at least one catalyst layer comprising, on a hydrogen side 131 of membrane assembly 100: hydrogen generating catalyst layer(s), hydrogen oxidizing catalyst layer(s) and/or bifunctional catalyst layer(s) capable of hydrogen generation as well as hydrogen oxidation.

It is noted that either of catalyst layers 131, 141 may comprise one or more materials, and may include different materials to support the opposite catalytic reactions. For example, catalyst layer of oxygen-side electrode 140 on oxygen side 141 may comprise one or more materials to generate oxygen and one or more same or different materials to reduce oxygen, while catalyst layer of hydrogen-side electrode 130 on hydrogen side 131 may comprise one or more materials to generate hydrogen and one or more same or different materials to oxidize hydrogen. It is further noted that catalyst materials for one direction of operation (fuel cell mode 90A or electrolysis mode 90B) may be more efficient than the catalyst materials for the opposite direction of operation, depending, e.g., on the expected operation profile of reversible system 300 (e.g., on the required power supply rate and/or on the hydrogen refilling rate). It is further noted that other than prior art such as U.S. Patent Application Publication No. 20130146471, multiple catalyst materials may be integrated in a single respective catalyst layer that is operative in both reaction directions, in both fuel cell mode 90A and electrolysis mode 90B, and are not separated into two or more distinguishable layers. Examples for catalyst materials are provided below.

Self-refueling power-generating system 300 further comprises an oxidant unit 330 configured to supply oxygen or air to reversible device 310 when operated in fuel cell mode, and optionally receive oxygen from reversible device 310 when operated in electrolyzer mode. Optionally, oxidant unit 330 may comprise an oxygen tank 332 for storing oxygen and may comprise a compressor 334 for compressing oxygen received from AEM device 310 into oxygen tank 332. Alternatively, oxygen compression may be provided by AEM device 310 during its operation as an electrolyzer in the electrolyzer mode. Supplying pure oxygen to oxygen-side electrode 140 during power generation in fuel cell mode may increase the efficiency of system 300 as well as simplify system 300 by making use of the oxygen produced together with hydrogen generation in the electrolyzer mode—possibly yielding a closed oxygen circuit. If needed, any of an additional pump, a $CO_2$ filter and/or a humidification unit may be included in the closed oxygen circuit (as in, e.g., FIG. 4B).

Self-refueling power-generating system 300 further comprises a hydrogen unit 350 configured to supply hydrogen to reversible device 310 when operated in fuel cell mode, and optionally receive hydrogen from reversible device 310 when operated in electrolyzer mode. Optionally, hydrogen unit 350 may comprise a hydrogen tank 352 for storing hydrogen and may comprise a compressor 354 for compressing hydrogen received from AEM device 310 into hydrogen tank 352. In electrolyzer mode, the generated hydrogen may be passed through a drying unit (not shown) and compressed, optionally electrochemically within AEM device 310, or optionally with the use of a mechanical, electrochemical or other compressor 354.

Self-refueling power-generating system 300 further comprises a water unit 340 configured to supply water (indicated schematically) and/or dilute electrolyte to reversible device 310. Water unit 340 may comprise a radiator 342 for dissipating heat and condensing water from reversible device 310 in the fuel cell mode, a liquid/gas separation module 344 for removing gases such as oxygen from the fluids received from reversible device 310 and a water pump 346 for pumping water to reversible device 310. Dilute alkaline electrolyte (e.g., at concentration lower than 3 M) and/or deionized water may be circulated to control the operation temperature. The water circulation may be controlled to maintain the optimal operation temperatures in the fuel cell and electrolyzer modes. The circulated water or alkaline water may be supplied directly to oxygen side 141 (adjacent to oxygen-side catalyst layer 140) via a circulation circuit which also serves as the water supply for hydrogen generation in the electrolyzer mode. Water that is generated by consumption of hydrogen during power generation in the fuel cell mode, may optionally be separated from the reactant gas/gases and returned to the water circulation circuit to replenish any water consumed during the hydrogen generation in the electrolyzer mode. Supply of water or dilute electrolyte to reversible device 310 may be carried out in a closed circuit and in conjunction with the supply of oxygen to reversible device 310.

In certain embodiments, gas/liquid separation module 344 may be configured to deliver separated oxygen from reversible device 310 (produced in electrolyzer mode) to oxidant unit 330, e.g., to compressor 334 and stored in an oxygen tank 332 (or alternatively using an air pump 333 for pumping, e.g., ambient air to supply oxidant). Water circulation may be provided directly to oxygen side 141 of reversible device 310 and the water may optionally be made alkaline by the addition of KOH or other alkaline salt, which may improve performance of reversible device 310. By combining the water and oxygen in the oxygen electrode, local relative humidity may be fixed at 100% due to the presence of excess liquid water. It is noted that while water consumption in the electrolyzer mode and water production in the fuel cell mode of reversible device 310 balance each other, some addition of water may be required due to system losses. A balance between oxygen and water supply may be controlled by controller 301 to optimize fuel cell performance, e.g., by using pure oxygen, and/or hydrophobizing or partially hydrophobizing the oxygen side catalyst layer and/or diffusion medium in membrane assembly 100, to preserve some areas free or partially free of liquid water and thereby allowing good access of the reactant oxygen to the catalyst surface. Water or dilute electrolyte may be stored in liquid/gas separation tank 344 or in an additional tank (as in, e.g., FIG. 4B). A water supply line may optionally be included in system 300 to assure that the water supply is not depleted. In both power generation and hydrogen generation modes, the water continues to function as the temperature controlling fluid, and is still passed through the radiator to dissipate excess heat generated by either device.

Advantageously, by capturing the water generated in the fuel cell mode and the oxygen (in addition to the hydrogen) generated in the electrolyzer mode, system 300 may be entirely self-contained without need of any external supply of hydrogen, water or air/oxygen, needing only external power input 326 for refueling (hydrogen generation in the electrolyzer mode), thus retaining one of the key benefits of battery-based power systems while allowing a conceptually unlimited amount of energy capacity without the need for a larger device, a capability unavailable to battery systems.

Self-refueling power-generating system 300 further comprises a power connection unit 320 configured to receive power from reversible device 310 when operated in the fuel cell mode, e.g., as power output 325; and to deliver power to reversible device 310 when operated in an electrolyzer mode, e.g., as power input 326. Power connection unit 320 may be configured to deliver the received power to an external load when required, and to receive power for delivery from an external source when available. In various embodiments, power input 326 may be received from various sources, such as an electric grid, renewable energy resources and/or batteries, possibly selected according to their respective time-dependent cost and availability. For example, power input 326 may be selected from solar panels or wind turbines when these are available, according to method 400 disclosed herein. Self-refueling power-generating system 300 may be used as any of a backup electrical power generation system, portable power generation system or any other power generation system that is entirely independent of normal user intervention for refueling operations, but rather self-recharges whenever the fuel storage unit is not full and an external electrical power supply is available. Certain embodiments comprise a grid setup comprising a plurality of independent systems 300, that may use separate or shared hydrogen fuel storage 352, and optional oxygen storage 332, optional battery banks (see, e.g., batteries 83 in FIG. 4A), and power sources 326 to provide a localized independent power supply solution to the users of that grid.

Controller(s) 301 may comprise one or more processor(s) associated with respective memory and interfaces to any of the units in self-refueling power-generating system 300, e.g., any of power connection unit 320, oxidant unit 330, water unit 340 and/or hydrogen unit 350. As illustrated schematically in FIG. 2A, self-refueling power-generating system 300 may be operated according to method 400, e.g., with controller(s) 301 operating reversible device 310, power connection unit 320, oxidant unit 330, water unit 340 and hydrogen unit 350 accordingly. Certain embodiments comprise computer program products comprising a computer readable storage medium having computer readable program embodied therewith and configured to carry out the relevant stages of method 400, e.g., via controller 301. FIG. 2B below discloses various embodiments of controller(s) 301.

As illustrated schematically in FIG. 2A, method 400 may comprise selecting the operation mode of reversible device 310 in fuel cell mode if energy is required by an external load, or as electrolyzer mode if external power is available (stage 410) and if the hydrogen tank(s) is not full (stage 412). Otherwise, electrolyzer mode is not operated (stage 415). In electrolyzer mode, the amount of hydrogen required to fill the hydrogen tank(s) may be calculated (stage 420) and accordingly a filling time and/or an electrolysis efficiency may be determined (stage 422) and compared to the availability of external power (stage 430). If sufficient power and time are available, electrolysis may be carried out with reversible device 310 at electrolyzer mode, e.g., at a maximal operation point (stages 432, 440) until the hydrogen tanks are full, otherwise an alert may be sent to the consumer (stage 434). Hydrogen production in electrolyzer mode may be set at times when external power is at high availability and/or at low price, to ensure cost effectiveness and availability of hydrogen for operating reversible device 310 at fuel cell mode when power is required. Specifically, method 400 may further comprise optimizing the electrolysis profile in consideration of external parameters (stage 425) such as availability and tariffs of external power and hydrogen content threshold(s) defined to support recurring operation in fuel cell mode if required (see a non-limiting example in FIG. 6C).

Method 400 may be used to determine the operating point of the electrolyzer mode of self-refueling power-generating system 300, allowing the consumer to optimize hydrogen effective cost versus system fueling requirements. Based on the hydrogen level following the operation in fuel cell mode; the acceptability of any of the filling time, the electrolysis efficiency, the hydrogen refueling rate and/or available power; and required hydrogen refueling parameters, method 400 may optimize operation of system 300 in electrolyzer mode. This approach takes advantage of the expected low frequency of use for power generation relative to what would otherwise be idle time. Operating system 300 for hydrogen recharging using much lower power than the nominal power generation capacity means the performance requirements for the hydrogen (and oxygen) generation are strongly mitigated, allowing minimal if any compromise on performance of the power generation direction of the hydrogen exchange.

For example, the hydrogen (and oxygen) refueling process in the electrolyzer mode may be carried out at a selected and potentially much slower rate in the case of relatively low frequency of use for power generation. The degree of such downscaling of the refueling rate may be selected according to specific use cases of the general system design, as well as the specific status of the device itself post-delivery, such as the amount of fuel remaining versus full capacity, the expected time until next usage, and the degree of criticality to reach a certain state of refueling within a certain timeframe.

Method 400 may be used to operate self-refueling power-generating system 300 comprising reversible device 310 that is operable in fuel cell mode 90A using hydrogen from hydrogen tank 352, and in electrolyzer mode 90B providing hydrogen to hydrogen tank 352. Method 400 may comprise operating reversible device 310 in fuel cell mode 90A when energy is required therefrom, and when not in fuel cell mode 90A: calculating an amount of hydrogen needed to fill hydrogen tank 352 (stage 420), determining a tank filling time or a target electrolysis efficiency according to a predefined criterion (stage 422), and operating reversible device 310 in electrolyzer mode 90B at a set electrolysis current corresponding to the target electrolysis efficiency if sufficient filling time is available (stage 432), or providing an alert and operating reversible device 310 in electrolyzer mode 90B at a maximal electrolysis current if sufficient filling time is not available (stage 440).

FIG. 2C is a high-level flowchart illustrating a method 450 of configuring a power-generating system to be self-refueling and self-sustaining, according to some embodiments of the invention. The method stages may be carried out with respect to system 300 and reversible device 310 described above, which may optionally be configured to implement method 450. Method 450 may be at least partially implemented by at least one computer processor, e.g., in a power-generating system the comprises a reversible device comprising (i) a stack of electrochemical cells with respective membrane assemblies, the device configured to be operated alternately as a fuel cell in a fuel cell mode and as an electrolyzer in an electrolyzer mode, wherein each of the membrane assemblies has a hydrogen-side catalyst layer configured to catalyze hydrogen oxidation in the fuel cell mode and to catalyze hydrogen formation in the electrolyzer mode and an oxidant-side catalyst layer configured to catalyze oxygen reduction in the fuel cell mode and to catalyze oxygen formation in the electrolyzer mode, the catalyst layers being separated by a separation layer, (ii) a hydrogen unit configured to supply hydrogen to the reversible device when operated in the fuel cell mode, and receive and optionally compress hydrogen from the reversible device when operated in the electrolyzer mode, and (iii) a power connection configured to receive power from the reversible device when operated in the fuel cell mode, and deliver power to the reversible device when operated in the electrolyzer mode, wherein the power connection is configured to deliver the received power to an external load when required, and to receive power for delivery from an external source when available. Certain embodiments comprise computer program products comprising a computer readable storage medium having computer readable program embodied therewith and configured to carry out any of the relevant stages of method 450. Method 450 may comprise the following stages, irrespective of their order.

Method 450 may comprise determining operation of the reversible device in the fuel cell mode or in the electrolyzer mode according to power requirements and power availability (stage 401), e.g., according to method 400, e.g., using artificial intelligence or machine learning algorithms and taking into account predetermined expected use cases, specific customer needs, time-criticality in increasing the available stored hydrogen, as well as power cost, source and availability.

In various embodiments, method 450 may further comprise any of: optimizing the hydrogen-side catalyst layer and the oxidant-side catalyst layer to operate in both the fuel cell mode and the electrolyzer mode according to specified requirements (stage 252), configuring the membrane assemblies to have the catalyst layers and the separation layer embedded in continuous polymerized ionomer material (stage 254), configuring the separation layer to comprise at least one layer that includes surface-charged particles that have a surface excess of charges, imparting ion conductivity along that surface when hydrated (stage 256), e.g., with the surface-charged particles comprising at least one of: charged clay particles, charged ceramic particles, graphene oxide particles, reduced or partially reduced graphene oxide particles and surface-charged polymer particles; and/or configuring the separation layer to have at least one protective layer adjacent to a respective one of the catalyst layers, to prevent dehydration thereof and/or exposure thereof to excessively oxidating and/or reducing conditions (stage 258).

Method 450 further comprises supplying oxygen to the reversible device in a closed circuit, by supplying oxygen to the reversible device when operated in the fuel cell mode, and receiving and compressing oxygen from the reversible device when operated in the electrolyzer mode (stage 460), and supplying water or dilute electrolyte to the reversible device in a closed circuit, by supplying and receiving water or dilute electrolyte in conjunction with the closed oxygen supply circuit by separating oxygen produced by the reversible device in the electrolyzer stage from the water or dilute electrolyte received from the reversible device (stage 470).

Advantageously, in use examples such as backup power scenarios, the most common operations would be to use a small portion of the available hydrogen. Given a reasonably predictable frequency of power outages, system 300 and method 450 may automatically run electrolysis at close to maximum efficiency and minimum refueling rate, and still expect the tanks to be full before the next outage. In use examples where power availability may be critical, the algorithm of method 400 may be optimized to refuel to some minimum critical amount of fuel at the maximum available rate, then run at maximum efficiency for the remaining refueling process. In use examples where cost of power supplied to the system for electrolysis is critical, system 300 may be configured to operate at maximum electrolysis efficiency. In examples use where system 300 is to be used next at a known future time, for example in some cases for portable power generation devices, the electrolysis operation could be fixed to a rate that delivers full tanks by an acceptable time ahead of the known next use.

FIG. 3A is a high-level schematic illustration of the operation of AEM and PEM reversible devices 310 in fuel cell mode 90A and in electrolyzer mode 90B, according to some embodiments of the invention. Disclosed membrane assemblies 100 and separation layer(s) 105 may be used for operation fuel cell mode 90A and in electrolyzer mode 90B, for which the principles of operation are briefly described. As non-limiting examples, implementations of fuel cell mode 90A and electrolyzer mode 90B with AEM (anion exchange membranes) and PEM (proton exchange membranes) are illustrated in a highly schematic manner. Each membrane assembly 100 in the stack of electrochemical cells typically has catalyst layers 130, 140 with corresponding catalysts that catalyze the respective reactions, as described briefly herein. In reversible devices 310 as disclosed herein, catalyst layers (electrodes) 130, 140 switch functions upon changing from fuel cell mode 90A to electrolyzer mode 90B, as explained below, e.g., anodes 130 in fuel cell mode 90A function as cathodes 130 in electrolyzer mode 90B and cathodes 140 in fuel cell mode 90A function as anodes 140 in electrolyzer mode 90B.

In fuel cell mode 90A, the electrochemical cells generate electricity (denoted schematically as "electricity out") using a fuel (e.g., hydrogen) and an oxidizing agent (e.g., oxygen). In the case of hydrogen AEM fuel cell mode 90A, the hydrogen fuel is oxidized by hydroxide ($OH^-$) anions formed at cathodic oxidant-side catalyst layer 140 from a reaction of water with oxygen, and moving through separation layer(s) 105 to anodic hydrogen-side catalyst layer 130, releasing electrons that travel through an external circuit to the cathode, thereby providing electrical power, as well as product water. In hydrogen PEM fuel cell mode 90A, the hydrogen is oxidized at anodic hydrogen-side catalyst layer 130, releasing electrons that travel through an external circuit to cathodic oxidant-side catalyst layer 140, thereby providing electrical power, and protons which move through separation layer(s) 105 to cathodic oxidant-side catalyst layer 140 where they combine with oxygen to form product water.

In electrolyzer mode 90B, the electrochemical cells use electricity (denoted schematically as "electricity in") to break down compounds (e.g., water) to yield products (e.g., hydrogen or other compounds). In AEM water electrolyzer mode 90B (including ones working with alkaline water, e.g., water with KOH), electricity is used to break down water to form hydrogen gas at cathodic hydrogen-side catalyst layer 130, as well as hydroxide ($OH^-$) anions that move through separation layer(s) 105 to anodic oxidant-side catalyst layer 140, where they are reacted to form oxygen and water. In PEM electrolyzer mode 90B, water is broken down at anodic oxidant-side catalyst layer 140 to yield oxygen gas and cations (e.g., protons) that move through separation layer(s) 105 to form hydrogen gas at cathodic hydrogen-side catalyst layer 130.

Electrolyzer mode 90B is typically used to generate hydrogen for storage a future use, e.g., in fuel cell mode 90A. Reversible devices 310 may be optimized to operate alternatively, or alternately, in fuel cell mode 90A and in electrolyzer mode 90B. Reversible devices 310 may further comprise gas diffusion layers (GDLs) that allow gases and/or fluids through. Membrane assemblies 100 may comprise separation layer(s) 105, optionally one or both catalyst layers (electrodes) 130, 140 and optionally also corresponding gas diffusion layers. For example, membrane assemblies 100 may be configured to operate as membrane-electrode assemblies (MEAS) that are the core components of proton-exchange membrane fuel cells (PEMFCs) and proton-exchange membrane electrolyzers (PEMELs); as well as of anion-exchange membrane fuel cells (AEMFCs) and anion-exchange membrane electrolyzers (AEMELs). Membrane assemblies 100 may be manufactured separately from the electrodes, or one or even both electrodes 130, 140 may be deposited on membrane assembly 100 itself, forming respective catalyst-coated membranes (CCM). Alternatively or complementarily, the catalyst layers may be deposited on gas-diffusion layers (GDLs), forming gas diffusion electrodes (GDEs) that are pressed against membrane assembly 100 to form the respective stacks.

Reversible AEM/PEM devices 310 may be operated as either fuel cells 90A and/or electrolyzers 90B, depending on their operation conditions and material and energy flows. Power flow, and flows of hydrogen, oxygen and water may be reversed upon switching the operation mode of reversible AEM/PEM devices 310 and layer properties of reversible AEM/PEM devices 310 may be selected to operate effectively in both modes, as disclosed herein.

Separation layer(s) 105 may comprise one or more sheet(s) that may range in thickness from a few μm, through tens of nm and up to one or two hundred μm. Separation layer(s) 105 may comprise multiple thin sheets, some thin and some thicker sheets, or any operable combination of number and thickness of the sheets, reaching an overall thickness of up to 200 μm. The sheets of separation layer(s) 105 may be configured to combine high ionic conductivity, water transportability, mechanical strength and stability, and low gas permeation, and be optimized respectively as disclosed herein. For example, one or more sheets of separation layer(s) 105 may be configured to support other, main separation sheet(s) of separation layer(s) 105. The supporting sheets in separation layer(s) 105 may be very thin, e.g., hundreds of nanometers thick, tens of nm thick or even 10 nm, 5 nm or less in thickness, possibly down to the thickness of ceramic particles embedded therein themselves.

In various embodiments, separation layer(s) 105 may comprise ionomer membranes, membranes that incorporate ionic particles, and/or stabilizing structures such as mesh supports or particles, which may also limit membrane swelling upon water uptake. The thickness and order of multiple separation layers 105 may be configured to optimize the parameters required for each type of operation mode and respective performance requirements. Membrane assemblies 100 may include several functional separation layers 105, and may be manufactured in different ways, e.g., by multi-layer deposition upon any substrate (including e.g., GDL(s), GDE(s), catalyst layers as CCMs, etc.) or by attaching of multiple supported and/or unsupported layers of separation layer(s) 105, as disclosed herein.

Separation layer(s) 105 are configured to provide a gas-tight separation between electrodes 130, 140 and to conduct ions and transfer water between electrodes 130, 140. Separation layer(s) 105 are configured to have high ionic conductance (e.g., larger than any of 5 S·cm$^{-2}$, 10 S·cm$^{-2}$, 20 S·cm$^2$, 50 S·cm$^2$, 100 S·cm$^2$, or intermediate values, when hydrated) to limit ohmic losses and high water permeance to limit device dry-out, e.g., by using high quality ionomers and/or by decreasing membrane thickness—either by reaching the limit for ultra-thin freestanding membranes or by using membranes supported by meshes, which however reduce the amount of available ionomer, yielding a tradeoff between the components contributing to ionic conductivity. It is noted that the conductance is the reciprocal of the area-specific resistance (ASR) of a layer such as a sheet or a membrane, and has units of S/cm$^2$. The conductance is a function of the layer's conductivity (which is a material property having units of S/cm), normalized by the thickness of that layer. For example, a 0.01 cm (100 μm) thick layer made of a material or composite with ion conductivity of 100 mS/cm, has a conductance of 10 S/cm$^2$ (100 mS/cm divided by 0.01 cm), and accordingly that layer has an ASR of 0.1 Ω·cm$^2$). Disclosed separation layer(s) 105 and membrane assemblies 100 are characterized by a combination of high ionic conductivity, high mechanical strength, and low gas crossover.

Membrane assemblies 100 may be designed to optimize the performance of reversible devices 310 by adjusting the architecture of the electrodes to support the respective electrochemical and physical processes. For example, membrane assemblies 100 may be configured to assure percolation through the ionomer-rich phase to ensure ionic transport through membrane assembly 100 as a whole. Membrane assemblies 100 may further be configured to manage water transport within the ionomer, and to form, by configuration of the catalyst and support particles, a percolation network that provides electronic conductivity. Membrane assemblies 100 may further be configured to locate the catalyst particles accurately at the ionomer-pore interfaces, forming a three-phase interface, to support the catalytic processes (e.g., avoiding fully covering catalyst particles by ionomer and setting the catalyst particles close to the ionomer phase). Membrane assemblies 100 may be porous in order to provide a path for the gas reactants.

FIGS. 3B-3D provide non-limiting examples for membrane assemblies 100, according to some embodiments of the invention. In various embodiments, membrane assemblies 100 may be designed to be part of reversible device 310 which comprises one or more electrochemical cells that can function both in fuel cell mode 90A and in electrolyzer mode 90B, depending on inputs and control of reversible device 310 and system 300. Separation layer(s) 105 and/or membrane assemblies 100 may be optimized to enable efficient operation of reversible devices 310 in both fuel cell and electrolyzer modes.

In non-limiting examples, as illustrated e.g., in FIG. 3B, disclosed membrane assemblies 100 may comprise at least one pair of catalyst layers (electrodes) 130, 140 separated by separation layer 105 and all embedded in continuous polymerized ionomer material 110 (illustrated schematically overlapping and throughout layers 130, 105, 140, with narrow margins that are optional and illustrated mainly for clarity of the explanation). Membrane assemblies 100 may be produced by continuous deposition of ionomer material on a substrate and, during the continuous depositing of the ionomer material—depositing in consecutive steps anode material, optionally separator material and cathode material—to embed in continuous polymerized ionomer material the anode material and the cathode material, separated by separation layer 105 (that may comprise only the ionomer material and/or optionally additional binder material). It is noted that the order of the layers may be reversed, e.g., first depositing one catalyst layer 140, then separation layer 105 and then another layer 130, and/or multiple sets of layers may be deposited in a single process. Membrane assemblies 100 may be attached to corresponding substrate (e.g., GDL) on either or both sides, contacting either or both catalyst layers 130, 140. Various embodiments of membrane assemblies 100 are disclosed in WIPO Patent Application No. PCT/IL2022/050091 and are incorporated herein by reference in their entirety. For example, ionomer material 110 may comprise electrospun nanofibers and electrodes 130, 140 may comprise corresponding catalyst particles that may be electrosprayed in association with the electrospun ionomer material 110. Alternatively or complementarily, ionomer material 110 may comprise electrosprayed material and electrodes 130, 140 may comprise corresponding electrospun catalyst fibers in association with the electrosprayed ionomer material 110. In certain embodiments, catalyst material of either or both electrodes 130, 140 may be electrospun together with ionomer material 110.

In non-limiting examples, as illustrated e.g., in FIGS. 3C and 3D, disclosed membrane assemblies 100 may comprise, between electrodes 130, 140, separation layer 105 that is made of one or more layers of polymer matrix 110 and ion-conductive particles 120, and may be relatively thick (e.g., tens of μm, and up to 100-200 μm). Polymer matrix 110 may comprise ionomer material(s) 110 and have high ion conductivity (e.g., between 10 mS/cm and more than 100 mS/cm, or any intermediate values), while particles 120 may be used to improve mechanical properties, (for example, yield stress, strain at break, resistance to creep, or other desirable properties, as can be measured comparatively with equivalent polymer without ceramic additives) and possibly also improve the ion conductivity of separation layer 105. Alternatively or complementarily, polymer matrix 110 may have low ionic conductivity and include a high solid content (e.g., over 60%, 70%, 80%, 85%, 90% or more by weight) of ion-conductive particles 120. Various embodiments of membrane assemblies 100 are disclosed in WIPO Patent Application No. PCT/IL2021/051524 and are incorporated herein by reference in their entirety. For example, separation layer 105 may comprise multiple layers made of different materials and/or comprising different amounts or types of ion-conductive particles 120. For example, separation layer 105 may comprise a middle polymeric layer that is ion conductive (e.g., have an ion conductance that is larger of any of 5 S/cm$^2$, 10 S/cm$^2$, 20 S/cm$^2$, 20 S·cm$^{-2}$, 50 S·cm$^{-2}$, 100 S·cm$^{-2}$, or any intermediate values. In various embodiments separation layer 105 may be made of ionomer material and may be from about 5 μm thick, and up to 100-200 μm thick (or have intermediate values, e.g., between any of 5 μm to 30 μm, 10 μm to 50 μm, 30 μm to 100 μm, 10 μm to 200 μm or within other subranges, e.g., within 50-80 μm), and flanking thin layers of polymer matrix with ion-conductive particles 120 embedded therein, e.g., few to tens of nm thick, which interface electrodes 130, 140. In certain embodiments, separation layer 105 may comprise two or more polymer layers which may be ionomeric and have high ion conductivity, interspaced by three or more thinner composite layers configured to strengthen separation layer 105 mechanically and protect the edges of polymer layers that interface electrodes 130, 140 from dehydration (during device operation) and/or chemical degradation by exposure to dry gases and/or catalytically active materials. For example, FIG. 3D illustrates schematically protective layers 110A, 110C flanking central polymeric layer 110B (in some embodiments an additional composite layer may be set to split polymer layer 110B in two). Composite layers 110A, 110C, when thin, may even be porous, as the main gas barriers are the thicker polymer layers that may be selected to provide overall sufficient ion conductance over the full stack, which is sufficiently blocking gas and liquid crossover. For example, separation layer(s) 105 may be configured to have a total ASR that is smaller than 200 Ω·cm$^2$, smaller than 100 Ω·cm$^2$, smaller than 50 Ω·cm$^2$, or having intermediate ASR values. Separation layer(s) 105 may be configured to have these ASR values while keeping their area-specific hydrogen permeation values smaller than about $10^{-7}$ mol/s/m$^2$/Pa in fuel cell mode, and smaller than about $10^{-8}$ mol/s/m$^2$/Pa or even lower in electrolyzer mode, depending on the desired degree of hydrogen pressurization. In certain embodiments, separation layer 105 may comprise one-sided protection of a thicker polymer layer by a thinner composite layer (e.g., only one of layers 110A, 110C on one side of polymer layer 110B) that interfaces only one of electrodes 130, 140. Component layers of separation layer(s) 105 may be selected to have specific characteristics relating to their order in the stack and the functioning of device 310. For example, the layers may be selected from: (i) ionomeric layer, (ii) ionomeric layer with particles for added strength, (iii) ionomeric layer with ion-conductive particles for added strength and enhanced ion conductivity, (iv) passive or even porous polymer layer with high concentration of ion-conductive particles for added strength and ion conductivity, as well as protection against dehydration of ionomeric layers, (v) thin passive polymer layer with low concentration of ion-conductive particles for added ion conductivity, and so forth, for any required combination of features. Separation layer(s) 105 may be produced in a range of ways, including attachment of free membrane layers, deposition of consecutive layers on a substrate (e.g., on electrodes 130, 140 and/or GDLs 135, 145) and/or combinations thereof. Formation of individual layers may be carried out by polymerization of respective monomers (and/or oligomers), including or followed by any of cross-linking polymer chains, functionalization into ionomers if needed and/or mixture of particles that are ion-conductive or not, into any of the fluid precursor(s) prior to polymerization. Individual layers may then be attached to form separation layer 105 and/or consecutive layers 105 may deposited onto respective substrates, followed by drying (or optionally peeling in case of using a sacrificial substrate).

In some embodiments, particles 120 may be surface-charged and ion-conducting in hydrated media by means of excess surface charge. For example, nanoparticles 120 may comprise nanoparticles of any of LDH (as ion-conductive particles 120), bentonite, montmorillonite, laponite, smectite, halloysite, cloisite, hydrotalcite (as non-limiting examples for charged clay particles 120), zirconium oxide, titanium oxide (as non-limiting examples for surface charged non-clay ceramic particles 120), graphene oxide, reduced or partially reduced graphene oxide, boron nitride, functionalized polyethylene, polytetrafluoroethylene, poly(ethylene tetrafluoroethylene) or other polymer nanoparticles, or their combinations, configured as surface charged particles 120. In non-limiting examples, nanoparticles 120 may include any type of chemically inactive nanoparticles that do not react chemically or electrochemically with the anions or cations conducted through separation layer(s) 105 and with chemical reactions taking place in the respective membrane assembly 100. It is noted that particles 120 may only be ion conducting to some extent, and not interact chemically in any other way. In some embodiments, chemically inactive nanoparticles 120 may be configured to reinforce ionomer matrix 110 and increase its mechanical strength. In some embodiments, the amount of chemically inactive nanoparticles maybe at least any of 1, 2, 5 or 10 weight %, or intermediate values for layers with low solid content, 20-50 weight % or intermediate values for layers with medium solid content, or 50-90 weight % or even up to 100 weight %, or intermediate values, for layers with high solid content—used in dependence of the layer thickness and function with the stack, as explained herein.

In various embodiments, at least some of separation layer(s) 105 may comprise both chemically inactive nanoparticles and chemically active particles as particles 120. In various embodiments, at least some of separation layer(s) 105 may comprise both surface-charged particles and uncharged particles as particles 120. In various embodiments, separation layer 105 may be configured to comprise a combination of (i) ion-conductive clay nanoparticles 120 (e.g., charged ceramic particles or other surface-charged particles) comprising a high solid component (e.g., 70-100% weight % of particles) combined with (ii) neutral, stable polymer (e.g., as matrix 110) to form one or more high-temperature stable composite separation layer(s) 105. In various embodiments, protective layer(s) 110A, 110C may be formed on the surface of separation layer 105 (e.g., on polymer layer 110B) and/or on layers thereof to enhance stability, durability, strength or reduce gas crossover, with any combination of low, medium or high solids content, being a porous or non-porous layer, and using ion-conducting or non-conducting solid particles and polymer binder. Protective layer(s) 110A, 110C may be configured to allow sufficient ion conductance and water permeation, by adjusting the thickness of protective layer(s) 110A, 110C within a range between a few nanometers to a few microns, or up to about ten microns, or according to the requirements of the specific application.

In non-limiting examples, hydrogen-side catalyst layer 130 may include ionomer(s) with embedded hydrogen oxidizing and/or hydrogen evolving (generating) catalyst particles 132 such as nanoparticles made of any of Pt, Ir, Pd, Ru, Ni, Co, Fe and their alloys, blends and/or combinations, optionally supported on carbon or other conducting substrates. Alternatively or complementarily, hydrogen-side catalyst layer 130 may comprise modified carbons with embedded catalytic groups such as nitrides or various transition metals. Alternatively or complementarily, hydrogen-side catalyst layer 130 may comprise transition metal oxides or hydroxides based on Ni, Co, Mn, Mo, Fe, etc., nitrogen-doped and/or metal-doped carbon materials. Hydrogen-side catalyst layer 130 may be between 2 μm to 20 μm thick (or within subranges such as 2 μm to 5 μm, 5 μm to 10 μm, 10 μm to 15 μm to 20 μm, or other intermediate ranges) and may have an ionomer content of between 0% to 40% w/w (or within subranges such as 0% to 10% w/w, 5% to 20% w/w, 10% to 30% w/w, 20% to 40% w/w, or other intermediate ranges). Hydrogen-side catalyst layer 130 may be configured to be stable over the full voltage range of electrode operation, e.g., from under about −0.2 V in electrolyzer mode to over about +0.4V in fuel cell mode, versus a reversing hydrogen electrode.

Typical oxygen-side catalysts comprise metal oxide(s) and/or or metal hydroxide(s) that are stable over the full voltage range of electrode operation, e.g., from under about 0.6V in fuel cell mode to about 2.0V in electrolyzer mode versus a reversing hydrogen electrode. In non-limiting examples, oxygen-side catalyst layer 140 may include ionomer(s) with embedded cathode catalyst particles 142 such as nanoparticles made of oxygen reducing and/or oxygen evolving (generating) catalysts made of any of Ag, Ag alloyed with Pt, Pd, Cu, Zr, Ag, Ni, Fe, Mn, Co, Pt, Ir, Ru their alloys, blends and/or combinations, possibly combined with metal oxides such as, e.g., cerium oxide, zirconium oxide, their alloys, blends and/or combinations. Alternatively or complementarily, oxygen-side catalyst layer 140 may comprise the metal particles in oxide or hydroxide form and/or include surface oxide or hydroxide layers. Alternatively or complementarily, oxygen-side catalyst layer 140 may comprise transition metal(s), metal oxide(s) and/or metal hydroxide(s) that are based on Ni, Fe, Co, Mn, Mo and their alloys, mixed oxides or mixed hydroxides such as spinel, perovskite or layered double hydroxide (LDH) structures, potentially doped with or loaded with Pt, Ir, Ru, Ag or other elements to enhance oxygen generation and/or reduction performance. Oxygen-side catalyst layer 140 may be 10 μm to 30 μm thick.

Gas diffusion layer(s) (GDLs) 135 and/or 145 may include any type of gas diffusion layers such as carbon paper, non-woven carbon felt, woven carbon cloth and the like, nickel, titanium or stainless steel meshes, felts, foams, sintered microspheres, or other porous and electrically conductive substrates. In some embodiments, GDLs 135 and/or 145 may be attached to a microporous layer (MPL), made, e.g., from sintered carbon and/or optionally polytetrafluoroethylene (PTFE) or other hydrophobic particles, or from various porous metallic or other porous conductive layers.

In non-limiting examples of AEM implementations, ionomeric material matrix 110 may comprise a continuous anion conducting ionomer comprising, e.g., polymers or copolymers of (vinylbenzyl)trimethylammonium chloride, wherein the chloride counterion may be exchanged to any desired anion, copolymers of diallyldimethylammonium chloride (DADMAC), wherein the counterion may be exchanged to any desired anion, styrene-based polymers having quaternary ammonium anion conducting group, quaternized poly (vinylalcohol) (QPVA), bi-phenyl or tri-phenyl backboned polymers with one or more functional groups that could include alkyl tether group(s) and/or alkyl halide group(s) and/or equivalent groups, poly(arylpiperidinium) and other polymers containing cyclic quaternary ammonium in the backbone or on tethered sidechains, poly(bis-arylimidazoliums), cation-functionalized poly(norbornenes), neutral polymers or polymer membranes with grafted anion-conductive sidechains, or any other anion-conducting polymer. In some embodiments, the anion conducting ionomer may be crosslinked, e.g., using crosslinking agent(s) selected according to the type of the ionomer to be crosslinked, such as divinylbenzne, N,N,N',N'-tetramethyl-1,6-hexanediamine (TMHDA), 1,4-diazabicyclo[2.2.2]octane (DABCO), glyoxal, glutaraldehyde, styrene based polymer(s) having quaternary ammonium anion conducting group(s), bi-phenyl or tri-phenyl backboned with one or more functional groups that could include alkene tether group(s) and/or alkyl halide group(s) and/or equivalent groups, hydrocarbon chains, sulfur groups, siloxy groups, N-hydroxybenzotriazole groups, azide groups and the like. In some embodiments, the anion conducting ionomer may be a blend of several polymers, some of which may not be anion conducting.

In non-limiting examples of PEM implementations, ionomeric material matrix 110 may comprise a continuous cation conducting ionomer comprising, e.g., poly(aryl sulfones), perfluorinated polysulfonic acids such as Nafion®, polymers or copolymers of styrene sulfonic acid with various modifications, sulfonated polyimides, phosphoric acid-doped poly(benzimidazole), sulfonated poly(arylene ethers) such as sulfonated poly (ether ether ketone) (SPEEK) and/or other synthetic or natural cation exchange ionomers.

Elements from FIGS. 1-3D may be combined in any operable combination, and the illustration of certain elements in certain figures and not in others merely serves an explanatory purpose and is non-limiting.

FIGS. 4A and 4B are schematic illustrations of prior art systems 80 that are alternately operable as a fuel cell and as an electrolyzer. FIG. 4A schematically illustrates a reversible device 90 with related peripheral units including a power supply 81, an electricity consumer 82, an optional backup battery pack 83 and a hydrogen storage. FIG. 4B schematically illustrates a more detailed prior art configuration of system 80, including a schematic illustration of reversible device 90 comprising a stack of cells with membrane assemblies 95; the power circuit with schematically illustrated power output 85; the fuel circuit with, e.g., a hydrogen tank 91 and a hydrogen exhaust 93; an oxidant circuit 70 with air inlet, a $CO_2$ filter 71 configured to remove $CO_2$ from the inlet air, an air pump 72 configured to pressurize the filtered air, a humidification unit 75 configured to humidify the pressurized air and to deliver the humidified air to the oxygen side of device 90, receive returning air through humidification unit 75 and deliver it to an air exhaust 73; and a water circuit 60 cycling water from water reservoir 91 through pump 62 to device 90 and back through a radiator 63 to dissipate the generated heat. Reversible device 90 operates alternately as a fuel cell, converting hydrogen to water and electrical energy, and as an electrolyzer, generating hydrogen from water under energy input, in coupling with a counter electrode (e.g., an oxygen electrode, a hydrogen peroxide electrode, a secondary alkaline battery electrode such as a nickel-based electrode, etc.). For example, in alkaline devices 90, the reactions on the hydrogen side may be described as $H_2+2OH^- \leftrightarrow 2H_2O+2e$ ($\rightarrow$anodic hydrogen oxidation reaction as fuel cell, $\leftarrow$cathodic hydrogen evolution reaction as electrolyzer) and $O_2+2H_2O+4e^- \leftrightarrow 4OH^-$ ($\rightarrow$cathodic oxygen reduction reaction, ORR, as fuel cell, $\leftarrow$anodic oxygen evolution reaction, OER, as electrolyzer), with the hydroxide $OH^-$ moving through membrane assembly 95 from the oxygen side to the hydrogen side in fuel cell mode and from the hydrogen side to the oxygen side in electrolyzer mode as result of water electrolysis—e.g., through alkaline electrolyte such as KOH.

Advantageously, disclosed systems 300 and reversible devices 310 overcome the high cost and complex logistics of refueling hydrogen, by regenerating hydrogen in the electrolyzer mode, and in addition overcome the maintenance issues of delivering oxidant and water or dilute electrolyte—recycling both oxygen and water/dilute electrolyte. Moreover, the recycling of oxygen in electrolysis mode may be carried out when power is available and unexpensive (e.g., from the grid or from renewable sources), while the fuel cell mode is configured to provide power when needed or when expensive. Operation methods are provided to optimize the regeneration of hydrogen and oxygen when power supply is available—yielding high operational efficiency. For example, disclosed methods take into account predetermined expected use cases, specific customer needs, time-criticality in increasing the available stored hydrogen, as well as power cost, source and availability.

Figure 5A:
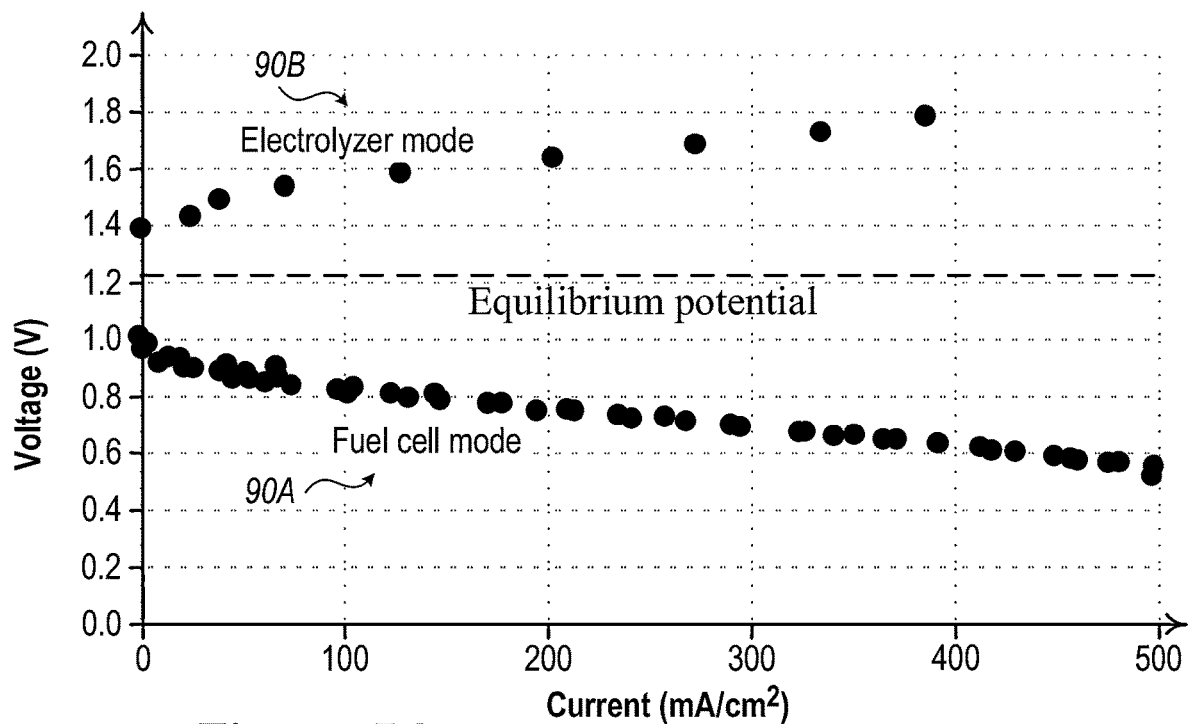
FIGS. 5A and 5B provide experimental data for operating membrane assemblies in fuel cell mode and in electrolyzer mode, according to some embodiments of the invention.
Figure 5B:
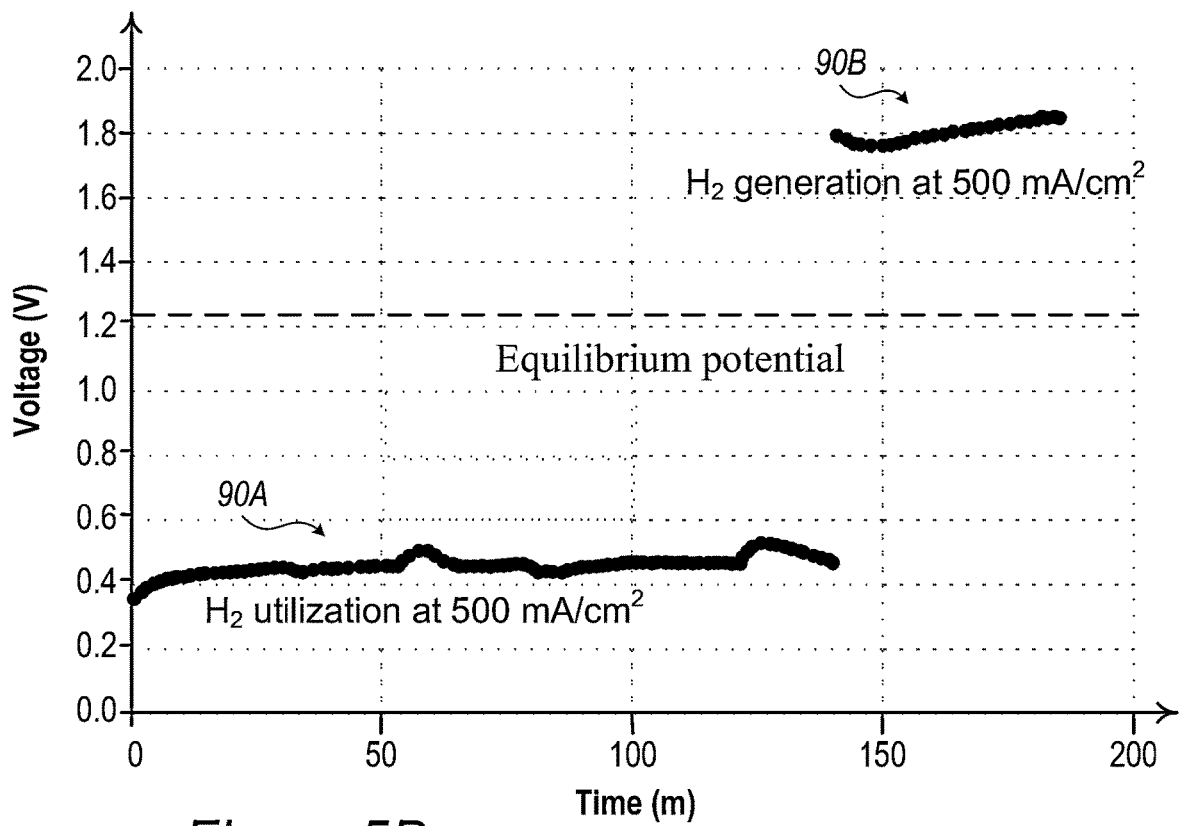

FIGS. 5A and 5B provide experimental data for operating membrane assemblies 100 in fuel cell mode 90A and in electrolyzer mode 90B, according to some embodiments of the invention. FIG. 5A illustrates the membrane polarization during the experiment, indicating the reversible operation of membrane assembly 100 in fuel cell mode 90A and in electrolyzer mode 90B; and FIG. 5B illustrates the hydrogen utilization (in electrolyzer mode 90B) and hydrogen generation (in fuel cell mode 90A) during the experiment, at the corresponding operation voltages. In the experimental, non-limiting setting, membrane assembly 100 included hydrogen side catalyst layer 130 comprising Pt, Ru, and anion exchange ionomer, separation layer 105 comprising an alkaline exchange membrane, and oxygen side catalytic layer 140 comprising Ni, Fe and Pt. Membrane assembly 100 was operated in fuel cell mode 90A at 80° C., with a current of up to 500 mA/cm², and in electrolyzer mode 90B at 60° C., with a current of up to 400 mA/cm². Membrane assembly 100 was discharged at a constant current of 300 mA/cm² in fuel cell mode 90A, and provided with a constant current of 500 mA/cm² in electrolyzer mode 90B, with the total experiment running for about three hours. Accordingly, the reversible operation of device 310 in system 300 has been demonstrated.

Figure 6A:
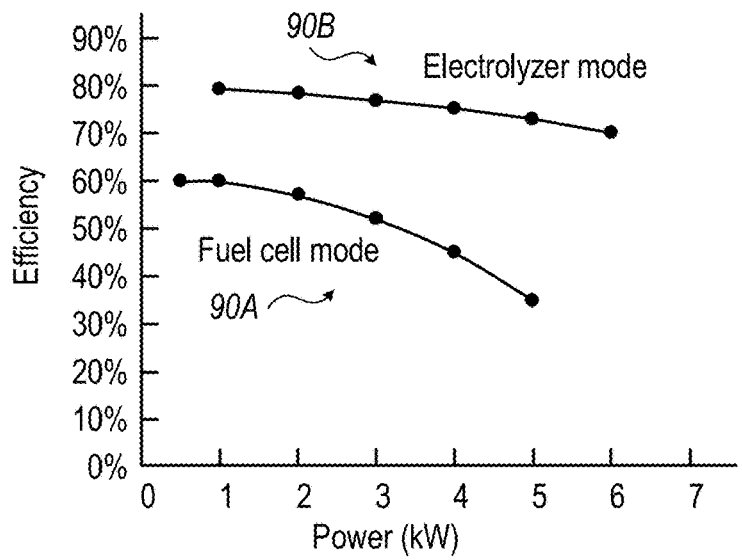
FIGS. 6A-6C provide simulation data for the reversible operation of disclosed systems under disclosed methods, according to some embodiments of the invention.
Figure 6B:
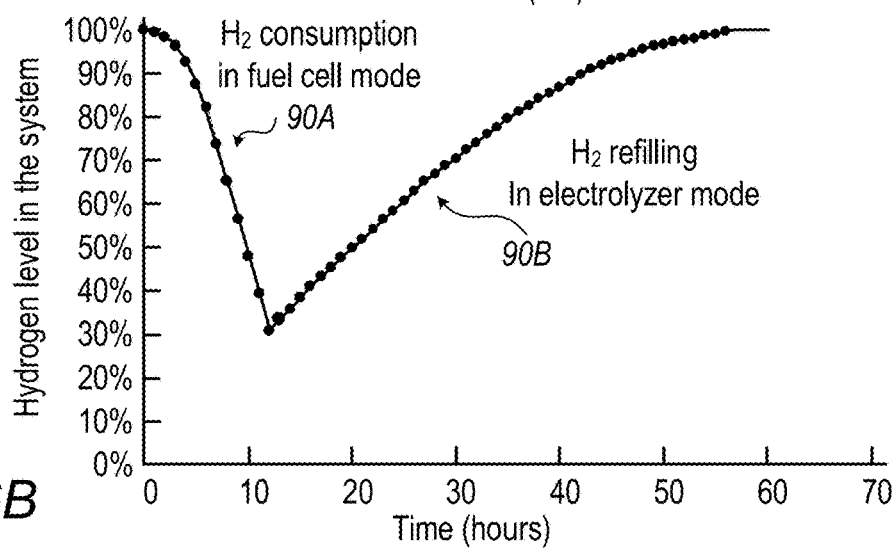
Figure 6C:
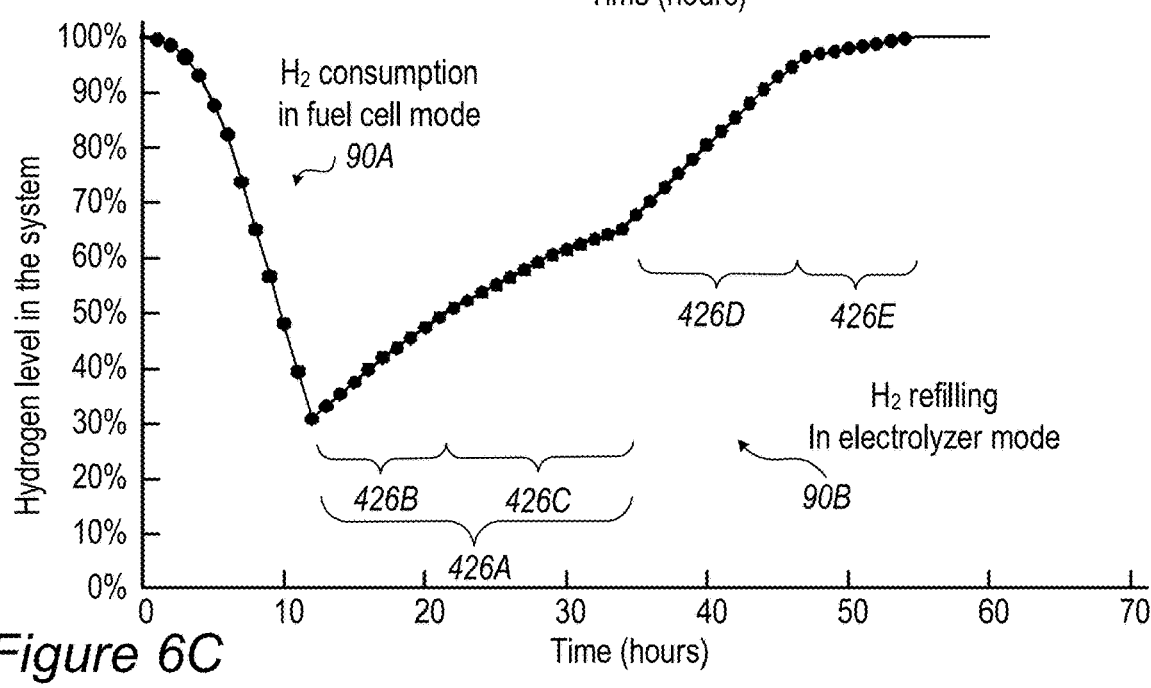

FIGS. 6A-6C provide simulation data for the reversible operation of disclosed systems 300 under disclosed methods 400, according to some embodiments of the invention. The simulation was performed based on non-limiting operational parameters to present the reversibility of system 300 and the operativity of methods 400 under different tariff regimes. FIG. 6A provides characteristic operation profiles in terms of efficiency versus power for operation in fuel cell mode 90A (power output) and in electrolyzer mode 90B (power input). FIG. 6B illustrates an example for operating system 300 and the resulting consumption and refilling of hydrogen—indicating the reversible operation of system 300 and its ability to maintain operability by switching between fuel cell mode 90A and electrolyzer mode 90B. FIG. 6C illustrates schematically the operation of method 400 under changing electricity tariffs, to refill hydrogen in electrolyzer mode 90B of system 300 under lower tariffs compared with the consumption of hydrogen in fuel cell mode 90A. FIG. 6C provides a non-limiting example for balancing the considerations of hydrogen level and electricity tariff to optimize the cycling of system 300. Specifically, following hydrogen consumption in fuel cell mode 90A, initially method 400 may comprise refilling hydrogen in electrolyzer mode 90B at a relatively high rate despite high electricity tariff in order to reach a predefined minimal amount of hydrogen (e.g., 50%), then decreasing the hydrogen refilling rate due to high electricity tariffs, to minimize costs (see stage 425 in FIG. 2A). In the non-limiting schematic example, numeral 426A denotes prevailing daytime tariffs following operation of system 300 in fuel cell mode 90A. Assuming a predefined threshold of 50% hydrogen content, electrolysis (mode 90B) may be carried out at full capacity until hydrogen content reaches the 50% threshold (denoted by numeral 426B) and then slowed to reduce cost during day tariffs threshold (denoted by numeral 426C). Then, electrolysis (mode 90B) may be carried out at full capacity once night tariffs are applicable (denoted by numeral 426D) to utilize the favorable power rates to replenish hydrogen and the maximal pace, and once day tariffs are again applicable, reducing the rate of electrolysis to fill hydrogen more slowly (denoted by numeral 426E). Clearly, one or more lower and upper threshold may be defined, e.g., with respect to required amounts of hydrogen under different operation profiles and to power availability and tariffs, to further optimize the operation in electrolysis mode 90B, including implementation of machine learning procedures to adjust the thresholds to changing operation and tariff regimes. Accordingly, reversible systems 300 and operation methods 400 are shown to be self-sustained and flexibly optimizable with respect to power generation, power consumption and operation costs.

Returning to FIG. 2B, controller(s) 301 may include one or more controller or processor 193 that may be or include, for example, one or more central processing unit processor(s) (CPU), one or more Graphics Processing Unit(s) (GPU or general-purpose GPU—GPGPU), a chip or any suitable computing or computational device, an operating system 191, a memory 192, a storage 195, input devices 196 and output devices 197.

Operating system 191 may be or may include any code segment designed and/or configured to perform tasks involving coordination, scheduling, arbitration, supervising, controlling, or otherwise managing operation of controller(s) 301, for example, scheduling execution of programs. Memory 192 may be or may include, for example, a Random-Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short-term memory unit, a long-term memory unit, or other suitable memory units or storage units. Memory 192 may be or may include a plurality of possibly different memory units. Memory 192 may store for example, instructions to carry out a method (e.g., code 194), and/or data such as user responses, interruptions, etc.

Executable code 194 may be any executable code, e.g., an application, a program, a process, task or script. Executable code 194 may be executed by controller 193 possibly under control of operating system 191. For example, executable code 194 may when executed cause the production or compilation of computer code, or application execution such as VR execution or inference, according to embodiments of the present invention. Executable code 194 may be code produced by methods described herein. For the various modules and functions described herein, one or more computing devices and/or components of controller(s) 301 may be used. Devices that include components similar or different to those included in controller(s) 301 may be used and may be connected to a network and used as a system. One or more processor(s) 193 may be configured to carry out embodiments of the present invention by for example executing software or code.

Storage 195 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, VR model data, parameters, etc. may be stored in a storage 195 and may be loaded from storage 195 into a memory 192 where it may be processed by controller 193. In some embodiments, some of the components shown in FIG. 2B may be omitted.

Input devices 196 may be or may include for example a mouse, a keyboard, a touch screen or pad or any suitable input device. It will be recognized that any suitable number of input devices may be operatively connected to controller(s) 301 as shown by block 196. Output devices 197 may include one or more displays, speakers and/or any other suitable output devices. It will be recognized that any suitable number of output devices may be operatively connected to controller(s) 301 as shown by block 197. Any applicable input/output (I/O) devices may be connected to controller(s) 301, for example, a wired or wireless network interface card (MC), a modem, printer or facsimile machine, a universal serial bus (USB) device or external hard drive may be included in input devices 196 and/or output devices 197.

Embodiments of the invention may include one or more article(s) (e.g., memory 192 or storage 195) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In certain embodiments, the stack of reversible device 310 in self-refueling power-generating system 300 may comprise membrane assemblies that include a hydrogen evolution/oxidation reaction (HER/HOR) electrode comprising a carbon-based gas diffusion electrode (GDE), and an oxygen evolution/reduction reaction (OER/ORR) electrode comprising a metal-based GDE—as provided in non-limiting examples of HER/HOR electrode 112/124 and OER/ORR electrode 114/122, disclosed herein. For example, in certain embodiments, the carbon-based GDE may comprises a gas diffusion layer (GDL), and a mixture comprising a catalyst dispersion and a binder dispersion, applied on the GDL, wherein the GDL with the applied mixture is hot pressed to form the GDE, and wherein the mixture comprises an ionomer, the catalyst dispersion comprises catalyst particles of one or more of: Ag, Pt, Ir, Pd, Ru, Ni, Co, Fe, Pd and their alloys, mixtures, oxides or mixed oxides, and the binder comprises at least one of Teflon, chlorotrifluoroethylene, perfluoroalkoxy alkane (PFA), ethylene tetrafluoroethylene, polyvinylidene fluoride and poly (methyl-methacrylate). In certain embodiments, the metal-based GDE may comprises a metal-based GDL, and a mixture comprising a catalyst dispersion and a binder dispersion, applied on the GDL, wherein the GDL with the applied mixture is hot pressed to form the GDE.

Embodiments of the present invention provide efficient and economical methods and mechanisms for preparing gas diffusion electrodes (GDEs) and thereby provide improvements to the technological field of electrochemical devices such as electrolyzers, fuel cells and combined bi-directional systems. Methods of preparing gas diffusion electrodes (GDEs) for electrochemical devices such as electrolyzers and fuel cells are provided. The GDEs comprise a gas diffusion layer (GDL), and a mixture comprising a catalyst dispersion and a binder (e.g., Teflon) dispersion, applied on the GDL, wherein the GDL with the applied mixture is hot pressed to form the GDE. GDLs may be carbon-based or metal-based, and ionomer may be added to improve performance if needed. Briefly hot pressing the layer at or near the glass temperature of the binder improves the adhesion of the layer and its cohesivity, which improves its long-term performance and durability in electrolyzer and/or fuel cell applications. For example, the catalyst dispersion may comprise a catalyst dispersion and the GDE may be a hydrogen evolution reaction (HER) electrode operable in an electrolyzer. In another example, the catalyst dispersion may comprise a catalyst dispersion, the mixture may further comprise an ionomer, and the GDE may be an oxygen reduction reaction (ORR) electrode operable in a fuel cell. Certain embodiments comprise electrodes that may be operable reversibly, e.g., be used as HER/HOR electrodes and/or OER/ORR electrodes, for example in reversible devices (e.g., dual cells) that can be operated alternately in fuel cell and electrolyzer modes. Typically fuel cell electrodes may be made with carbon-based GDLs and the fuel cells may be operated with ionomeric electrolyte, while electrolyzer OER electrode may be made with metal-based GDLs and the electrolyzer may be operated with liquid electrolyte. Dual cells may be configured with carbon-based GDLs for the HER/HOR electrodes and with metal-based GDLs for the OER/ORR electrodes. Either or both types of GDEs may be prepared with binder material and be hot-pressed to improve their performance and/or durability.

Figure 7A:
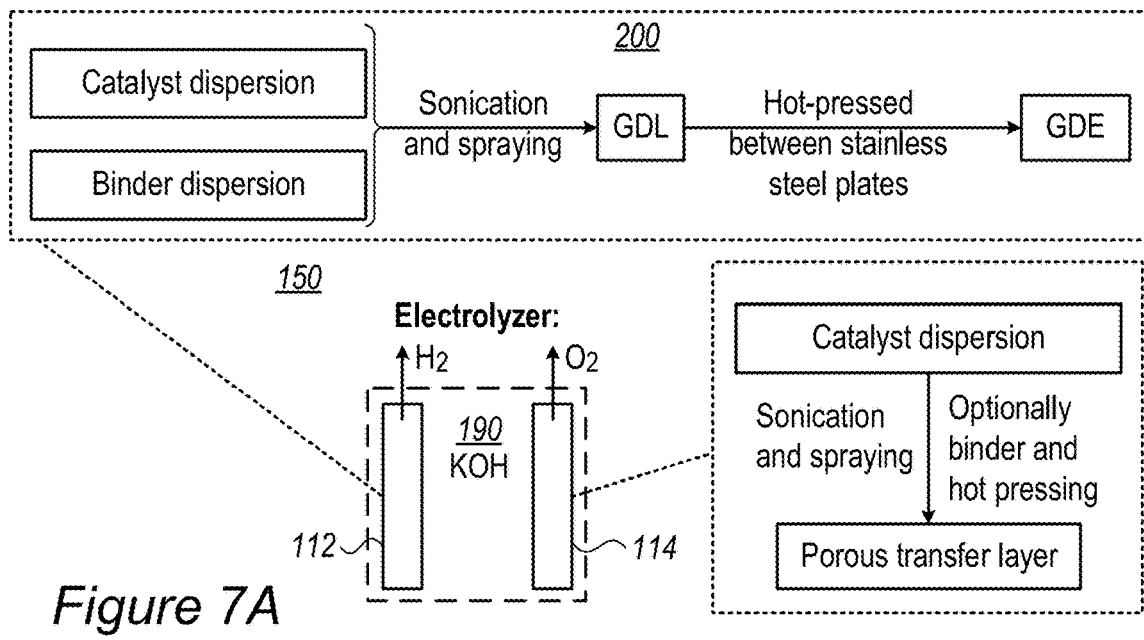
FIG. 7A is a high-level schematic block diagram of an electrolyzer, according to some embodiments of the invention.

FIG. 7A is a high-level schematic block diagram of an electrolyzer 150, according to some embodiments of the invention. Electrolyzer 150 comprises GDE 112 as HER made of the GDL with the applied mixture of catalyst dispersion and binder dispersion (e.g., comprising Teflon)—hot pressed thereupon, and further comprising a catalyst-coated porous transfer layer as an oxygen evolution reaction (OER) electrode 114 and electrolyte 190. In certain embodiments, OER electrode 114 with metal-based GDL may likewise include binder material and be hot-pressed. Electrolyte 190 may be alkaline and comprise e.g., KOH, $K_2CO_3$ and/or $KHCO_3$ solutions at concentrations up to 10 M (e.g., 0.01 M, 0.1 M, 1 M, 1-5 M, 3-10 M or intermediate values) or may possibly comprise water (with ionomer material combined in the catalytic layer providing ionic conductivity).

The binder material may be selected to enhance the stability and the durability of the electrode, particularly when hot pressed. Binder materials may comprise one or more materials, which have (i) low glass transition temperatures (e.g., Tg<180° C.), (ii) low swelling properties (e.g., less than 80% swelling in X-Y direction in wet conditions, at 80° C., OH— form)—to make the respective electrode mechanically stable, (iii) sufficient chemical stability at alkaline conditions (e.g., 1 M KOH), (iv) prolonged thermal stability, e.g., being stable above 100° C. for at least 1000 h.

Specific examples for alternative binders include chlorotrifluoroethylene, perfluoroalkoxy alkane (PFA), ethylene tetrafluoroethylene, polyvinylidene fluoride or poly (methylmethacrylate) or any combination of these materials. In any of the disclosed embodiments, the binder material may comprise Teflon and/or any binder(s) which conform to these requirements. In any of the embodiments in which Teflon is used, Teflon may be partly or fully replaced by other types of appropriate binders.

In any of the disclosed embodiments, hot pressing may be optimized with respect to the type of binder and with respect to other GDE components—to yield the most stable and most efficient electrode, depending on performance requirements. For example, hot pressing may be carried out within the temperature range of 80-180° C. (depending on the Tg of the selected binder as well as on the type of ionomer and other electrode materials) and carried out for the ranges of few seconds to a few minutes (e.g., between ten seconds and ten minutes).

In non-limiting examples, a mixture of catalyst (e.g., Pt) dispersion in a solvent (e.g., 2-propanol and DI (deionized) water) and binder (e.g., Teflon) dispersion in water may be applied (e.g., sonicated and sprayed) on the GDL, which may then be pressed between plates to form GDE 112. OER electrode 114 may comprise catalyst (e.g., Ni) dispersion in the solvent (e.g., 2-propanol and DI water), applied (e.g., sonicated and sprayed) on a Ni PTL (porous transport layer). In certain embodiments, OER electrode 114 may be produced as a PTL, using binder dispersion and hot pressing, e.g., with respective catalysts/binders coated on the metal-based PTL and hot pressing for OER electrode 114. OER electrode 114 may further comprise ionomer material, or comprise catalyst and binder material (e.g., Teflon) without additional ionomer.

Figure 7B:
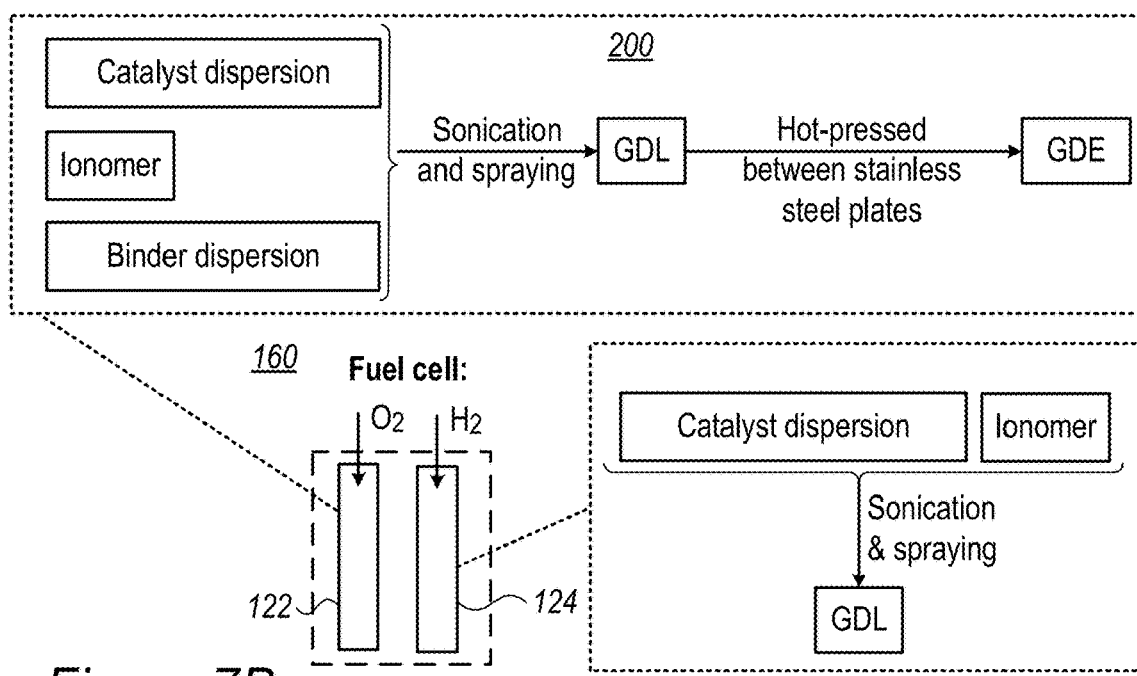
FIG. 7B is a high-level schematic block diagram of a fuel cell, according to some embodiments of the invention.

FIG. 7B is a high-level schematic block diagram of a fuel cell 160, according to some embodiments of the invention. Fuel cell 160 comprises GDE 122 as ORR made of the GDL with the applied mixture of catalyst dispersion, ionomer and binder (e.g., Teflon) dispersion hot pressed thereupon, and further comprising a hydrogen oxidation reaction (HOR) electrode 124. For example, HOR electrode 124 may comprises a catalyst (e.g., Pt) dispersion and ionomer, applied (e.g., sonicated and sprayed) on a HOR GDL. The ionomer material may provide ionic conductivity, without requiring electrolyte solution in fuel cell 160.

In non-limiting examples, a mixture of catalyst (e.g., Ag) dispersion in solvent (e.g., 2-propanol and DI water), ionomer and binder (e.g., Teflon) dispersion in water may be applied (e.g., sonicated and sprayed) on the GDL, which may then be pressed between plates, for example stainless steel plates or other types of plates, to form GDE 122. HOR electrode 124 may comprise catalyst dispersion in solvent (e.g., 2-propanol and DI water) mixed with ionomer and applied (e.g., sonicated and sprayed) on a GDL.

In various embodiments, the solvent(s) may comprise, e.g., any of water, 2-propanol, ethanol, methanol, N-methyl-2-pyrrolidone, toluene, tetra-hydro-furan and/or combinations thereof with different ratios. Any of the dispersions may be formulated as an ink for the corresponding form of application.

In certain embodiments, GDEs (with carbon-based GDLs) may be used in fuel cells 160 both as ORR electrode 122 and as HOR electrode 124, with corresponding adjustments.

Figure 7C:
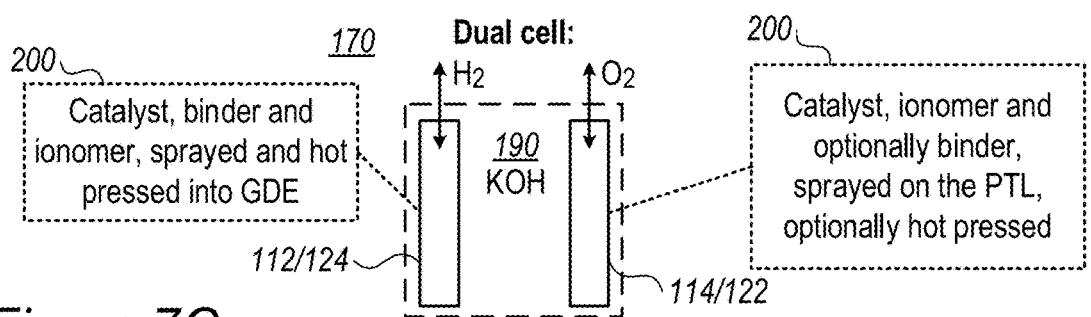
FIG. 7C is a high-level schematic block diagram of a dual cell, according to some embodiments of the invention.

FIG. 7C is a high-level schematic block diagram of a dual cell 170, according to some embodiments of the invention. Dual cell 170 may be reversible, configured to operate alternately (and reversibly) as electrolyzer 150 and fuel cell 160, depending on the operation conditions of dual cell 170, namely whether electricity is provided to dual cell 170 to generate hydrogen and oxygen by electrolysis (and be operated as electrolyzer 150, with electrolyte 190 comprising water or an alkaline solution) or whether hydrogen and oxygen are delivered to dual cell 170 to generate electricity (and be operated as fuel cell 160). Correspondingly, both GDEs, namely HER/HOR electrode 112/124 and OER/ORR electrode 114/122, may be produced as disclosed herein, by spraying catalyst dispersion, binder (e.g., Teflon) and ionomer material of respective GDLs and hot pressing them to form the respective GDEs. Clearly the exact details of the catalyst type, binder (e.g., Teflon) concentration and ionomer type and concentration may be optimized to provide the required ionic conductivity and electrode stability, e.g., from the options disclosed herein, with respect to specific assembly and operation parameters of dual cell 170. In certain embodiments, OER/ORR electrode 114/122 may be produced as a PTL, using binder dispersion and hot pressing, e.g., with respective catalysts/binders coated on the metal-based PTL and hot pressing for OER/ORR electrode 114/122. OER/ORR electrode 114/122 may further comprise ionomer material, or comprise catalyst and binder material (e.g., Teflon) without additional ionomer.

Figure 8:
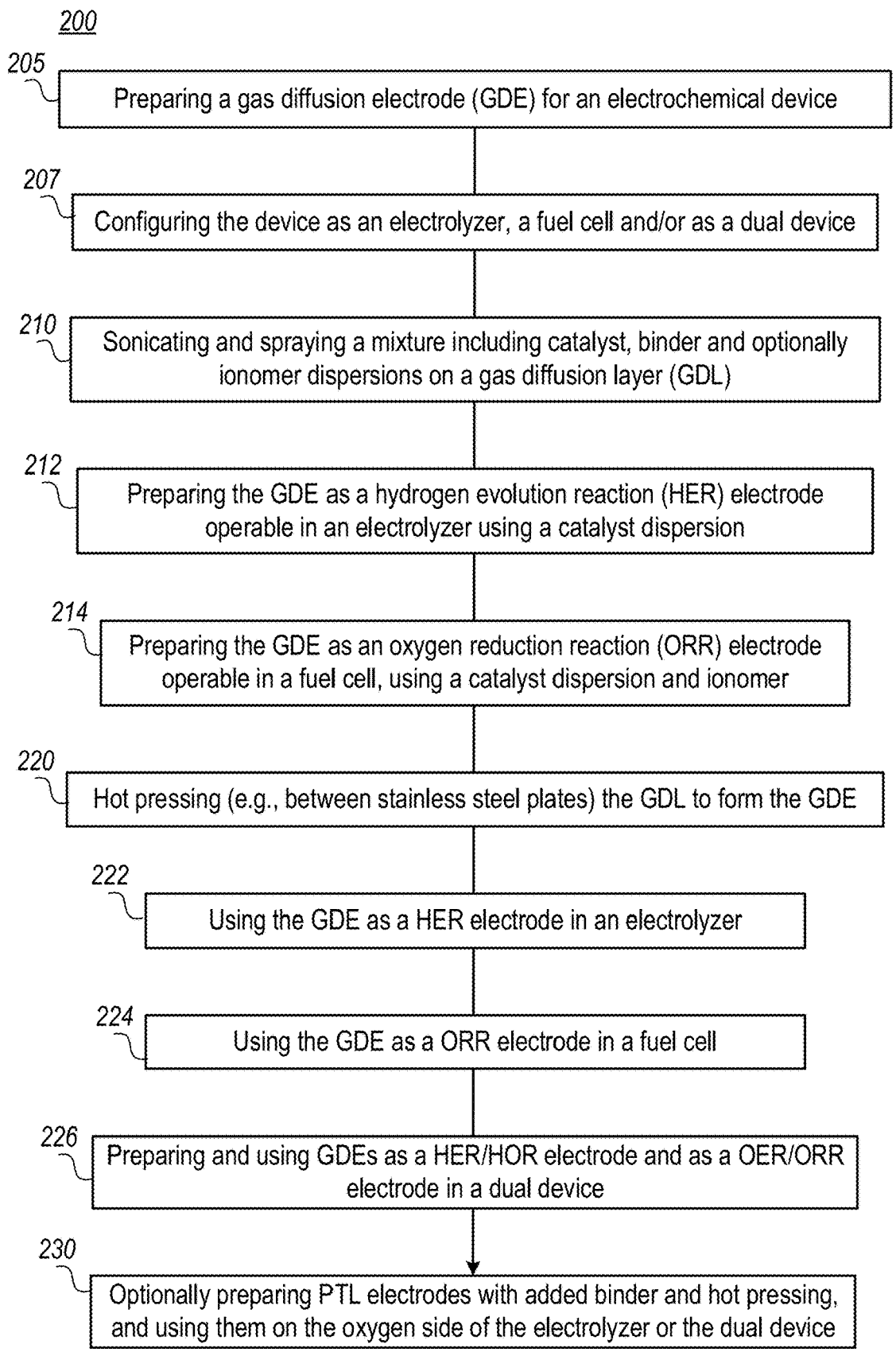
FIG. 8 is a high-level flowchart illustrating a method, according to some embodiments of the invention.

FIG. 8 is a high-level flowchart illustrating a method 200, according to some embodiments of the invention. The method stages may be carried out with respect to the disclosed GDE electrodes, electrolyzer 150 and/or fuel cells 160 described above, which may optionally be configured to implement method 200. Method 200 may comprise the following stages, irrespective of their order.

Method 200 may comprise preparing a gas diffusion electrode (GDE) for an electrochemical device (stage 205), the method comprising: sonicating and spraying a mixture on a gas diffusion layer (GDL), wherein the mixture comprises a catalyst dispersion and a binder dispersion (stage 210), and hot pressing the GDL to form the GDE (stage 220), for example at the glass transition temperature of the binder, and e.g., between plates.

In certain embodiments, method 200 may comprise preparing the GDE using a catalyst dispersion (stage 212), e.g., Pt, and using the GDE as a hydrogen evolution reaction (HER) electrode operable in an electrolyzer (stage 222), e.g., with a catalyst-coated porous transport layer (PTL) as an OER electrode and KOH electrolyte.

In certain embodiments, method 200 may comprise preparing the GDE using a catalyst (e.g., Ag) dispersion and ionomer (stage 214) and using the GDE as an oxygen reduction reaction (ORR) electrode operable in a fuel cell (stage 224), e.g., with a catalyst (e.g., Pt) dispersion and ionomer, sonicated and sprayed on a HOR GDL and KOH electrolyte.

In certain embodiments, method 200 may comprise configuring the device as an electrolyzer, fuel cell and/or a dual device (stage 207), with respective GDEs as ORR electrodes for fuel cells, HER electrodes for electrolyzers and/or preparing and using GDEs as a HER/HOR electrode and as a OER/ORR electrode in a dual device (stage 226). Method 200 may thus comprise using the GDEs to form a dual cell, that is operable alternately as an electrolyzer and as a fuel cell (with both GDEs including ionomer).

In various embodiments, disclosed uses of binder and hot pressing may be applied to one or both types of electrodes in each type of device. For example, in fuel cells, only ORR electrode or both ORR and HOR electrodes may be produced using binder dispersion and hot pressing, e.g., with respective catalysts/binders coated on respective carbon-based GDLs. In electrolyzers, only HER electrode or both HER and OER electrodes may be produced using binder dispersion and hot pressing, e.g., with respective catalysts/binders coated on carbon-based GDL for the HER electrode and on metal-based PTL for the OER electrode. In dual systems, the OER/ORR (on metal-based PTL) electrodes and the HER/HOR (on carbon-based GDL) electrodes may be produced using binder dispersion and hot pressing as disclosed herein. Specifically, in certain embodiments, PTL electrodes may be prepared with added binder and hot pressing, and be used on the oxygen side of the electrolyzer or the dual device (stage 230).

In various embodiments, catalyst dispersion for either electrode may include other types of catalysts, such as other members of the platinum group metals (PGMs), non-supported or supported on carbon. For example, the hydrogen-side catalyst layer may include ionomer(s) with embedded hydrogen oxidizing and/or hydrogen evolving (generating) catalyst particles such as nanoparticles made of any of Pt, Ir, Pd, Ru, Ni, Co, Fe, Pd—$CeO_X$ and their alloys, blends and/or combinations, optionally supported on carbon or other conducting substrates. Alternatively or complementarily, the hydrogen-side catalyst layer may comprise modified carbons with embedded catalytic groups such as nitrides or various transition metals. Alternatively or complementarily, the hydrogen-side catalyst layer may comprise transition metal oxides or hydroxides based on Ni, Co, Mn, Mo, Fe, etc., nitrogen-doped and/or metal-doped carbon materials. The hydrogen-side catalyst layer may have an ionomer content of between 0% to 40% w/w (or within subranges such as 0% to 10% w/w, 5% to 20% w/w, 10% to 30% w/w, 20% to 40% w/w, or other intermediate ranges). The hydrogen-side catalyst layer may be configured to be stable over the full voltage range of electrode operation, e.g., from under about −0.2 V in electrolyzer mode to over about +0.4V in fuel cell mode, versus a reversing hydrogen electrode. In non-limiting examples, the oxygen-side catalyst layer may include ionomer(s) with embedded cathode catalyst particles such as nanoparticles made of oxygen reducing and/or oxygen evolving (generating) catalysts made of any of $NiFe_2O_4$, Perovskites, Fe, Zn, Ag, Ag alloyed with Pt, Pd, Cu, Zr, Ag, Ni, Fe, Mn, Co, Pt, Ir, Ru their alloys, blends and/or combinations, possibly combined with metal oxides such as, e.g., cerium oxide, zirconium oxide, their alloys, blends and/or combinations. Alternatively or complementarily, the oxygen-side catalyst layer may comprise the metal particles in oxide or hydroxide form and/or include surface oxide or hydroxide layers. Alternatively or complementarily, the oxygen-side catalyst layer may comprise transition metal(s), metal oxide(s) and/or metal hydroxide(s) that are based on Ni, Fe, Co, Mn, Mo and their alloys, mixed oxides or mixed hydroxides such as spinel, perovskite or layered double hydroxide (LDH) structures, potentially doped with or loaded with Pt, Ir, Ru, Ag or other elements to enhance oxygen generation and/or reduction performance.

Gas diffusion layer(s) (GDLs) and/or may include any type of gas diffusion layers such as carbon paper, non-woven carbon felt, woven carbon cloth and the like, nickel, titanium or stainless steel meshes, felts, foams, sintered microspheres, or other porous and electrically conductive substrates. In some embodiments, the GDLs may be attached to a microporous layer (MPL), made, e.g., from sintered carbon and/or optionally polytetrafluoroethylene (PTFE) or other hydrophobic particles, or from various porous metallic or other porous conductive layers.

In various embodiments, the PTL (porous transport layer) may be made of the following materials: Ni, various grades of stainless steel, titanium or any combination of all of them together. In addition, it can be either felt, mesh, or dual layers, with different porosity values and different thicknesses. The PTL may be used with or without a mesoporous layer (MPL).

In non-limiting examples of AEM and/or PEM implementations, the ionomeric material matrix may comprise respective materials as described herein for respective AEM/PEM ionomeric material matrix 110.

Non-limiting examples and experimental results are provided in the following. In these examples, the combination of using Teflon material and brief hot-pressing was used to enhance the performance of the respective electrodes with respect to their stability and durability. GDEs with 5 $cm^2$ active area were prepared and tested in respective sealed electrolyzer and fuel cell configurations.

In the electrolyzer configurations, catalyst dispersion was applied to yield a loading of 0.17 mg/$cm^2$ on the HER GDE. The Teflon dispersion had a 60% wt % and 1.5 gr/ml density (in water) with particle size between 0.05-0.5 μm. Mixtures with Teflon content ranging between 3 wt %, 6 wt % and 10 wt % were compared. The mixture was sonicated for 15 minutes and sprayed by a spray gun on Freudenberg carbon paper GDLs, and then hot-pressed at 119° C. to change the Teflon to amorphous structure near its Tg (glass transition temperature). The Ni PTL OER electrode was prepared in a similar manner of spraying, without using Teflon, ionomer or applying hot pressing. The electrolyzer cells were assembled using Ni200 flow fields, stainless steel end plates, 50 μm PTFE sub-gaskets and 250/160 μm thick PTFE gaskets at the cathode/anode sides, respectively, sealed under a torque of 7 Nm.

In the fuel cell configurations, the catalyst dispersion was applied to yield a loading of 2.5 mg/$cm^2$ on the ORR GDE, with a 4 wt % commercial ionomer. The Teflon dispersion had a 60% wt % and 1.5 gr/ml density (in water) with particle size between 0.05-0.5 μm and an overall Teflon content of 3 wt %. The HOR electrode was prepared in a similar manner of spraying a mixture of catalyst dispersion applied to yield a loading of 1.4 mg/$cm^2$ and including 12 wt % commercial ionomer. Both mixtures were sonicated for 15 minutes and sprayed by a spray gun on Freudenberg nonwoven carbon GDLs with microporous layer. The ORR GDE was hot-pressed at 119° C. for 3 minutes at a pressure of 106 kg/$cm^2$, to change the Teflon to amorphous structure at its Tg (glass transition temperature). The fuel cells were assembled and sealed using 200 μm thick Kapton polyimide gaskets on both electrodes, under a torque of 7 Nm.

Figure 9A:
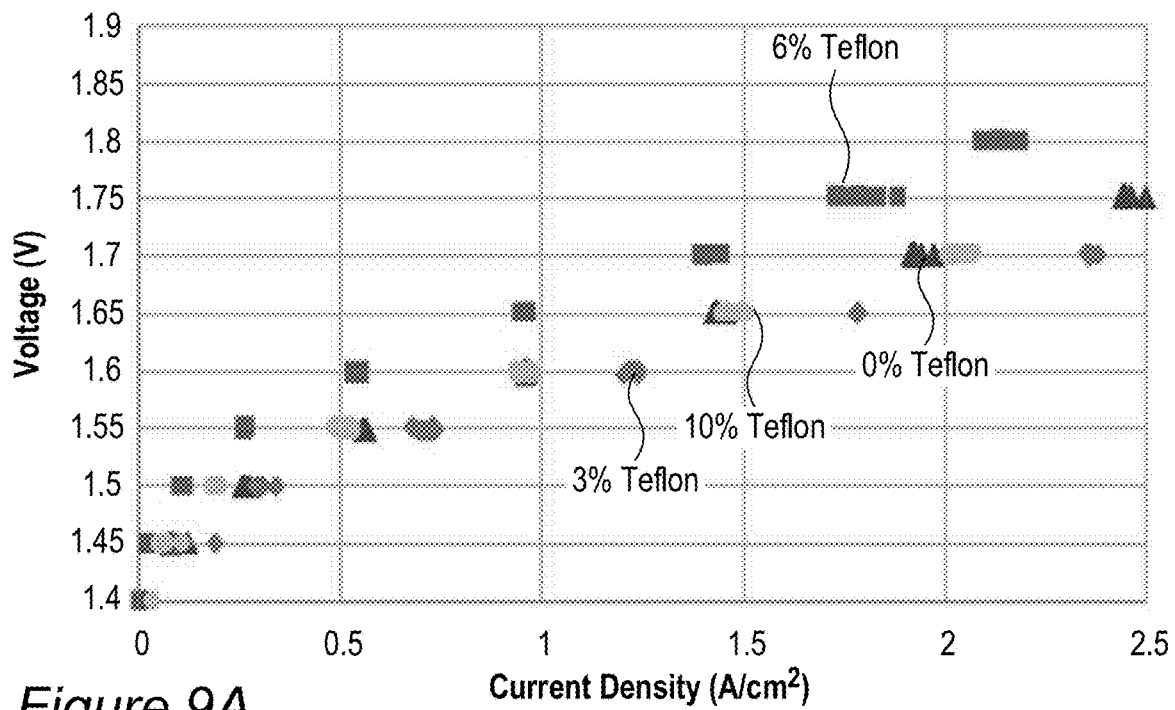
FIGS. 9A and 9B provide initial experimental results related to the operation of an electrolyzer, according to some embodiments of the invention.
Figure 9B:
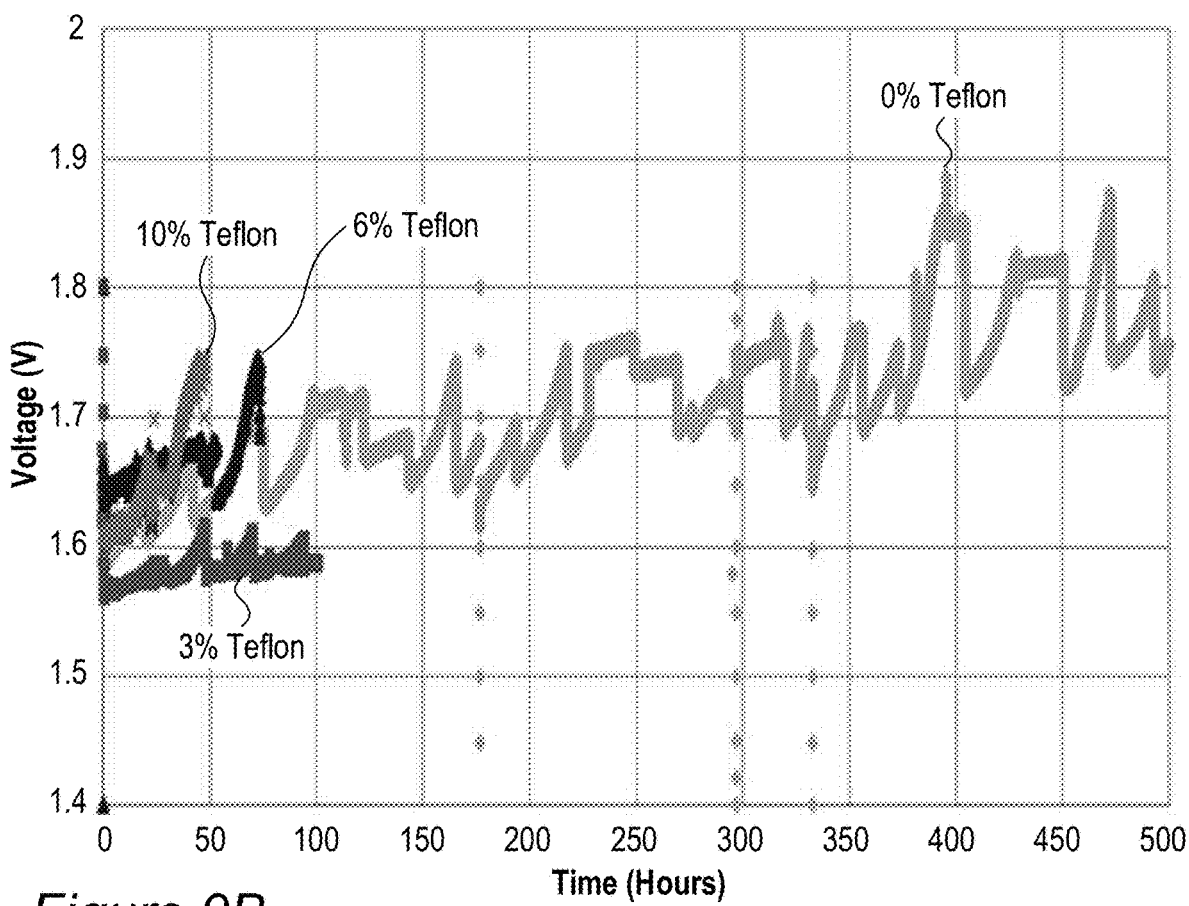

FIGS. 9A and 9B provide initial experimental results related to the operation of electrolyzer 150, according to some embodiments of the invention. FIG. 9A indicates the performance and FIG. 9B illustrates the durability of electrolyzer 150 having HER GDE 112 prepared from mixtures having no Teflon (0% Teflon content as comparison) and mixtures having Teflon content of 3 wt %, 6 wt % and 10 wt %. The results were measured for electrolyzers 150 described above, operating HER GDE 112 at 60° C. under 170 ml/h flow of 1 M KOH electrolyte, while OER electrode 114 was operated at room temperature without flow of electrolyte. It is noted that in this experiment, in a non-limiting manner, KOH was pumped only to the anode side, from which the KOH penetrated through the membrane and reached the cathode side. In a performance experiment (FIG. 9A) the resulting current density (corresponding to the hydrogen production level) was measured with respect to the applied voltage, while in a durability experiment (FIG. 9B) a constant level of current density (1 A/cm$^2$) was applied, which corresponds to a constant level of hydrogen production.

In FIG. 9A, for a given voltage, the efficiency of electrolyzer 150 is higher (greater hydrogen production) with higher current density, indicating maximal performance at a Teflon content of 3 wt %, which is better than no Teflon. In FIG. 9B, the increase in voltage level (for the same current density) indicates the degradation of HER GDE 112, indicating maximal durability at a Teflon content of 3 wt %. The inventors suggest that the intermediate level of Teflon content provides on the one hand a more stable GDE layer having better adhesion to the GDL (see also FIGS. 11A-11D for corresponding SEM images of fuel cell cathodes) while, on the other hand, not making the GDE too hydrophobic as to reduce the permeation of the liquid KOH electrolyte and of the gaseous oxygen release, which might have occurred at higher Teflon content. Clearly, the optimal Teflon content depends on the production and operation conditions of electrolyzers 150 and may change for different designs.

For example, it is noted however, that while Teflon makes the layer more hydrophobic and therefor requires longer time to equilibrate with the KOH electrolyte (that may lead to initial lower performance), in the long term the Teflon increases the durability of the layer, so there is some trade-off between initial performance and durability, which may be optimized in different ways, with different Teflon content, depending on details of production and use. Additional considerations involve the different effects of adding Teflon at different current densities, the possibility to include both Teflon and ionomer in the catalyst layer, which make the considerations and optimization more complex—(enhancing conductivity, but increasing sensitivity to the hot press parameters), and possibly requiring modification of catalyst loading. Accordingly, parameters of Teflon application and hot pressing may be modified and optimized with respect to the electrode composition and performance requirements. On the other hand, it is noted that replacing some or all of the ionomer in the electrode with Teflon may provide benefits such as less or no degradation in alkaline environment (as might occur to the functional groups of the ionomer) and reduction or prevention of swelling and of leaching out of the catalyst during operation, which are main causes for reduced lifetime and performance.

Figure 10A:
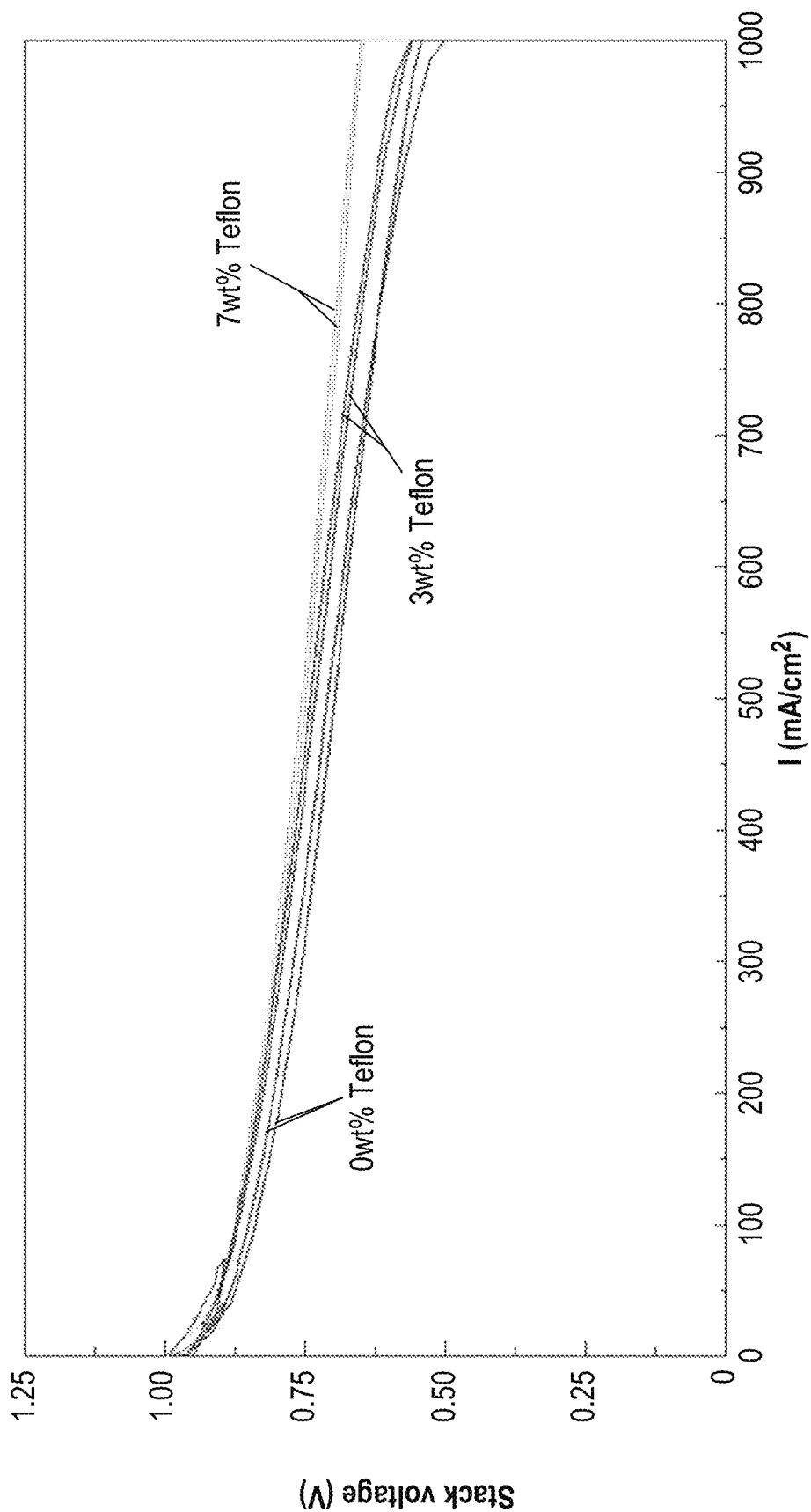
FIGS. 10A and 10B provide initial experimental results related to the operation of a fuel cell, according to some embodiments of the invention.
Figure 10B:
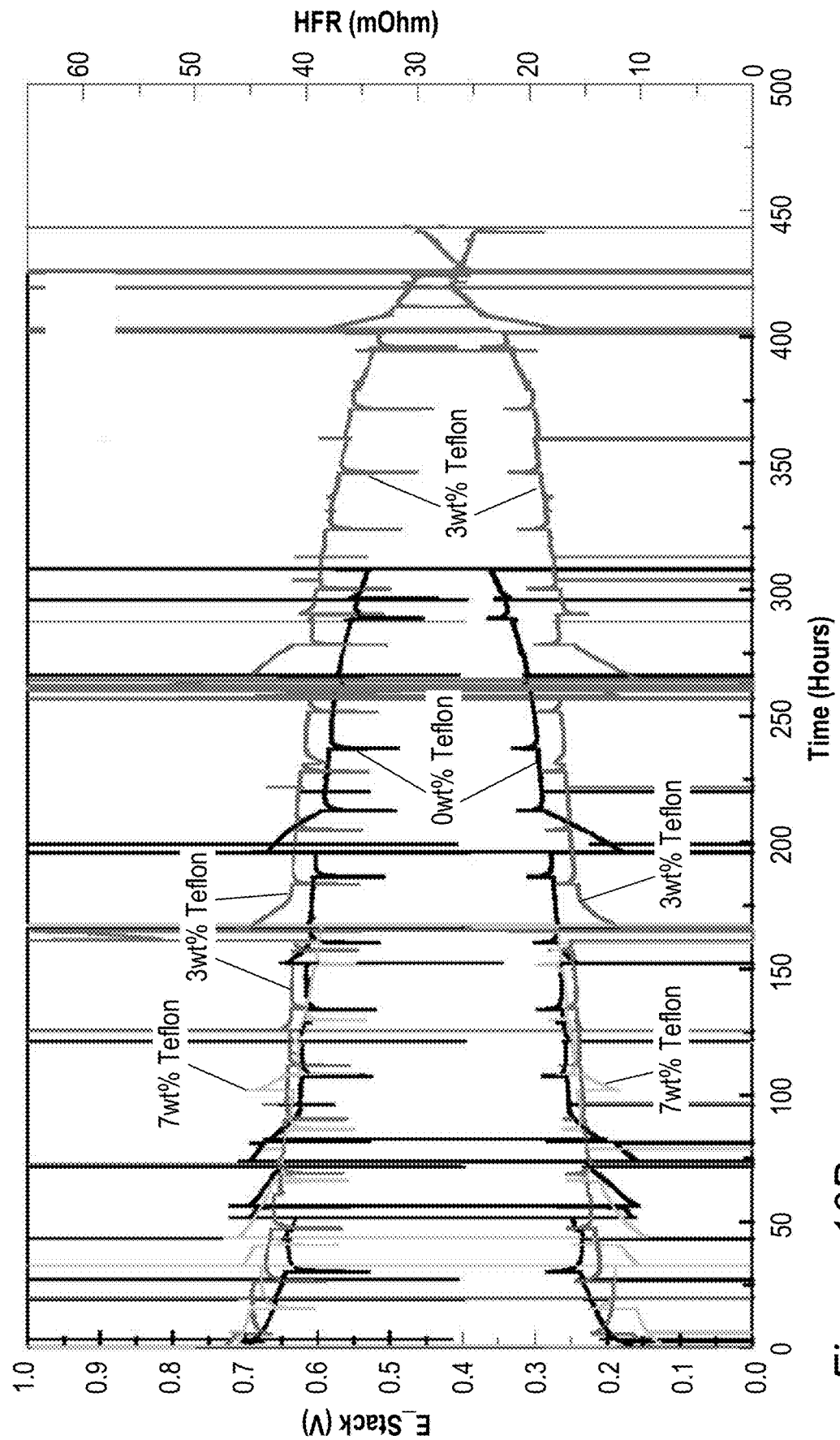

FIGS. 10A and 10B provide initial experimental results related to the operation of fuel cell 160, according to some embodiments of the invention. FIG. 10A indicates the initial performance and FIG. 10B illustrates the durability of fuel cell 160 having ORR GDE 122 prepared from mixtures having no Teflon (0% Teflon content as comparison) and mixtures having Teflon content of 3 wt % and 7 wt %. The results were measured for fuel cells 160 described above, operated at 80° C. The dew point for ORR GDE 122 was 76° C. and the back pressure 1 barg (gauge pressure); the dew point for HOR electrode 124 was 67° C. and the back pressure (BP) 3 barg (note, the non-limiting experimental application of back pressure to the H$_2$ side increases the water transport through the layer). In an initial performance experiment (FIG. 10A) air flow to ORR GDE 122 was 1 l/min and H$_2$ flow to HOR electrode 124 was 0.15 l/min; in a durability experiment (FIG. 10B) air flow to ORR GDE 122 was 0.2 ml/min and H$_2$ flow to HOR electrode 124 was 0.07 ml/min, while the current density was 0.5 A/cm$^2$ (the lower flow in the durability tests are in order to keep the MEA—membrane electrode assembly, from dry-out). In FIG. 10A, the efficiency of fuel cell 160 with Teflon content of 7 wt % in ORR GDE 122 was the highest over the entire current density range. In FIG. 10B, the lowest rate of degradation was in fuel cell 160 with Teflon content of 3 wt % in ORR GDE 122. The inventors suggest that the intermediate level of Teflon content provides on the one hand a more stable GDE layer having better internal adhesion and adhesion to the GDL (see also FIGS. 11A-11D for corresponding SEM images) while, on the other hand, maintaining sufficient ionic conductivity via the ionomer in the GDE, avoiding too much interference by the Teflon material.

In cases the method of adding Teflon and hot pressing the electrode are carried out for electrodes that include ionomer material (e.g., in fuel cells), the inventors have noted that carrying the process out when the ionomer includes $HCO_3^-$ as counter ions (rather than $OH^-$ as it does during operation with the electrolyte)—significantly reduces damage to the functional groups. Therefore, brief hot pressing around the glass temperature of Teflon is sufficient to improve electrode structure and layer adhesion and stability, while minimizing the damage to the ionomer and to electrode performance.

Figure 11A:
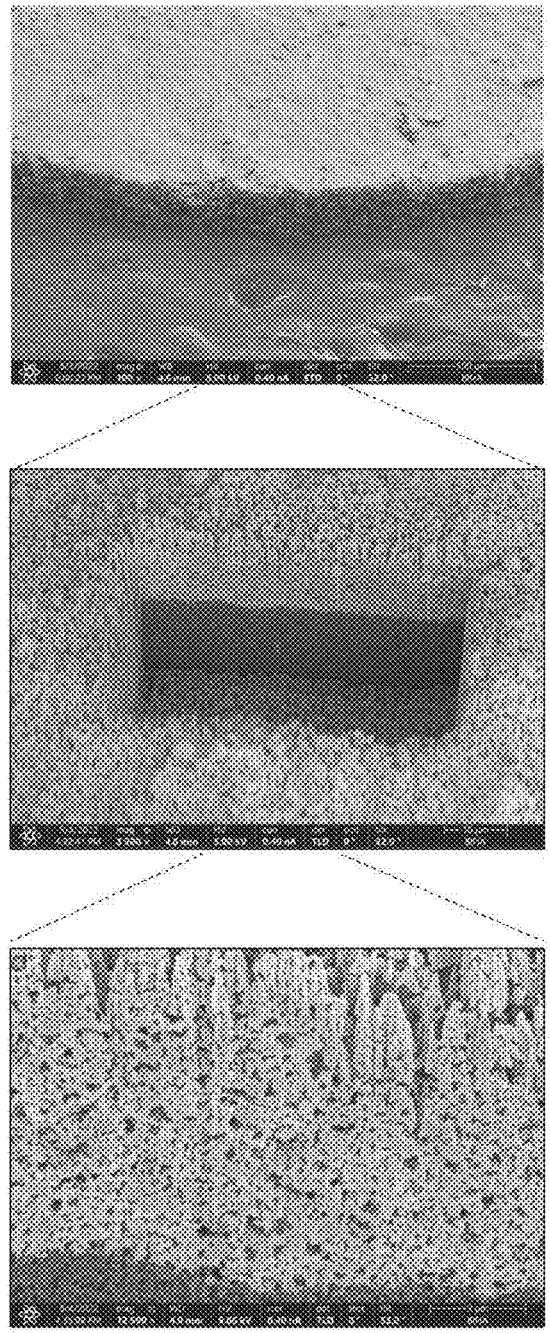
FIGS. 11A and 11B provide high resolution scanning electron microscope (HRSEM) images of fuel cell ORR GDE prepared with Teflon and hot pressing, before and after operation in a fuel cell (after durability test, 450 h at 80° C. under 0.5 A/cm$^2$), respectively, according to some embodiments of the invention, compared with FIGS. 11C and 11D that provide HRSEM images of prior art electrodes prepared without Teflon and without hot pressing according to prior art procedures, before and after operation in a fuel cell (after durability test, 310 h at 80° C. under 0.5 A/cm$^2$), respectively.
Figure 11B:
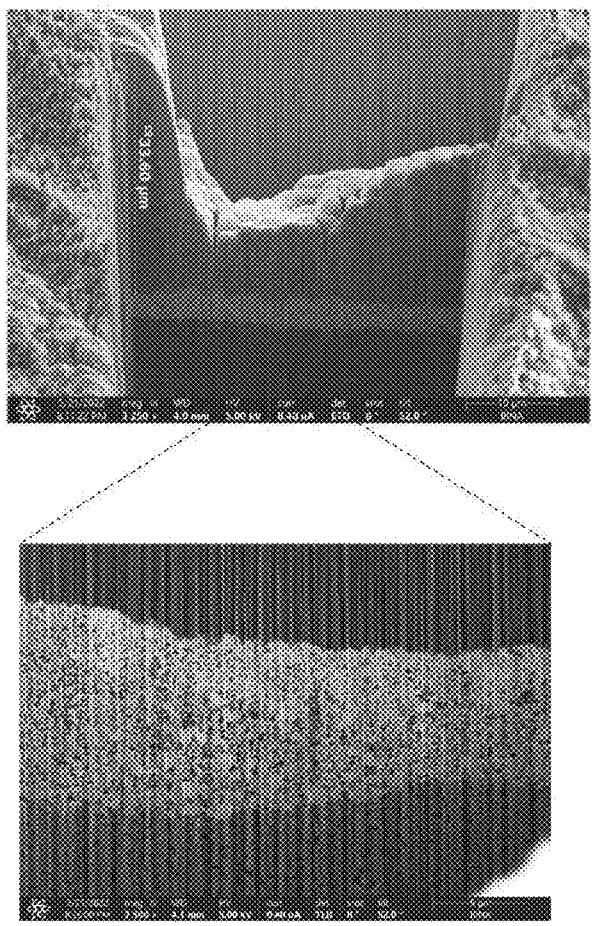

FIGS. 11A and 11B provide high resolution scanning electron microscope (HRSEM) images of fuel cell ORR GDE prepared with Teflon (3 wt %) and hot pressing, before and after operation in fuel cell 160 (after durability test, 450 h at 80° C. under 0.5 A/cm$^2$), respectively, according to some embodiments of the invention, compared with FIGS. 11C and 11D that provide HRSEM images of prior art electrodes prepared without Teflon and without hot pressing according to prior art procedures, before and after operation in fuel cell 160 (after durability test, 310 h at 80° C. under 0.5 A/cm$^2$), respectively.

The inventors note that comparing FIGS. 11A, 11B with FIGS. 11C, 11D, it seems that the Teflon and hot pressing helped keep the uniformity and integrity of the catalyst layer, preventing cracks and voids from being created during the durability test, and practically maintaining the layer morphology throughout the fuel cell operation. It is suggested that the Teflon binder creates a fine net that contributes to the stability of the layer, fixes its morphology and in small quantity does not interfere too much with the hydrophilicity/hydrophobicity of the layer, thereby keeping its good ionic conductivity—that is essential for stable durability test. In contrast, in prior art electrodes without Teflon and hot pressing, the catalyst layer is less uniform and exhibits non-patterned channels, cracks and voids that seem to have been created during the durability test, probably decreasing the voltage are related to leaching of ionomer and catalyst material which, together with reduced conductivity and formation of inactive regions contribute to fuel cell degradation. It is noted that upon applying hot pressing without addition of Teflon only minor changes in electrode durability have been observed. It is further noted that the exact percentage of Teflon and parameters of the hot pressing may change and be optimized with respect to the size, constituents and purpose of the electrode.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

It is noted that a value modified by the term "about" is understood to encompass ±10% of the value.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A self-refueling power-generating system comprising:
   a reversible device comprising a single stack comprising a plurality of electrochemical cells with respective membrane assemblies, the single stack of the reversible device configured to be operated alternately as a fuel cell in a fuel cell mode of the stack and as an electrolyzer in an electrolyzer mode of the stack,
   wherein each of the membrane assemblies in the single stack has a hydrogen-side catalyst layer configured to catalyze hydrogen oxidation in the fuel cell mode and to catalyze hydrogen formation in the electrolyzer mode and an oxidant-side catalyst layer configured to catalyze oxygen reduction in the fuel cell mode and to catalyze oxygen formation in the electrolyzer mode, the catalyst layers being separated by a separation layer,
   a controller configured to determine operation of the reversible device in the fuel cell mode or in the electrolyzer mode,
   a hydrogen unit configured to supply hydrogen to the reversible device when operated in the fuel cell mode, and receive and optionally compress hydrogen from the reversible device when operated in the electrolyzer mode,
   an oxidant unit configured to supply oxygen to the reversible device when operated in the fuel cell mode, and receive and optionally compress oxygen from the reversible device when operated in the electrolyzer mode,
   a water unit configured to supply water or dilute electrolyte to the reversible device in a closed circuit and in conjunction with the supply of oxygen thereto, wherein the water unit comprises a gas/liquid separation module configured to deliver separated oxygen from the reversible device to the oxidant unit, and
   a power connection configured to receive power from the reversible device when operated in the fuel cell mode and deliver power to the reversible device when operated in the electrolyzer mode, wherein the power connection is configured to deliver the received power to an external load when required, and to receive power for delivery from an external source when available,
   wherein the water is supplied to and removed from the oxygen-side catalyst layer, together with the oxygen.

2. The self-refueling power-generating system of claim 1, wherein the hydrogen unit further comprises a compressor configured to compress hydrogen from the reversible device when operated in the electrolyzer mode.

3. The self-refueling power-generating system of claim 1, wherein the oxidant unit further comprises a compressor configured to compress oxygen from the reversible device when operated in the electrolyzer mode.

4. The self-refueling power-generating system of claim 1, wherein the water unit is further configured collect and reuse water or dilute electrolyte during the operation in the electrolyzer mode.

5. The self-refueling power-generating system of claim 4, wherein the hydrogen unit, the oxygen unit and the water unit are configured to operate in respective closed circuits, and the system is self-sustained, using no external resource for water, oxygen or hydrogen.

6. The self-refueling power-generating system of claim 1, wherein the membrane assemblies are single layered solid state polymer membrane assemblies.

7. The self-refueling power-generating system of claim 1, wherein the membrane assemblies are reversible anion exchange membrane (AEM) assemblies in which the separation layer is configured to transfer anions therethrough.

8. The self-refueling power-generating system of claim 7, wherein the catalyst layers and the separation layer are embedded in continuous polymerized ionomer material and wherein:
the hydrogen-side catalyst layer is 2 μm to 20 μm thick, has an ionomer content of between 0% w/w and 40% w/w and is made of materials that are hydrogen oxidizing and/or hydrogen evolving catalysts,
the separation layer is between 50 μm and 80 μm thick and has an ion conductance larger than 5 S·cm$^{-2}$ when hydrated, and
the oxygen-side catalyst layer is 10 μm to 30 μm thick and comprises oxygen-reducing and/or oxygen-evolving catalyst material.

9. The self-refueling power-generating system of claim 7, wherein the separation layer comprises at least one layer that includes surface-charged particles that have a surface excess of charges, imparting ion conductivity along that surface when hydrated, wherein the surface-charged particles comprise at least one of: charged clay particles, charged ceramic particles, graphene oxide particles, reduced or partially reduced graphene oxide particles and surface-charged polymer particles.

10. The self-refueling power-generating system of claim 7, wherein the separation layer comprises at least one protective layer set adjacent to at least one of the catalyst layers, and being less than 10 μm thick or less than 5 μm thick.

11. The self-refueling power-generating system of claim 1, wherein the membrane assemblies are reversible proton exchange membrane (PEM) assemblies in which the separation layer is configured to transfer protons therethrough.

12. The self-refueling power-generating system of claim 1, wherein the stack is a single bifunctional stack that comprises at least three electrochemical cells with respective membrane assemblies.

13. The self-refueling power-generating system of claim 1, wherein the stack of the reversible device comprises membrane assemblies that comprise:
a hydrogen evolution/oxidation reaction (HER/HOR) electrode comprising a carbon-based gas diffusion electrode (GDE), and
an oxygen evolution/reduction reaction (OER/ORR) electrode comprising a metal-based GDE.

14. The self-refueling power-generating system of claim 13, wherein the carbon-based GDE comprises:
a gas diffusion layer (GDL), and
a mixture comprising a catalyst dispersion and a binder dispersion, applied on the GDL,
wherein the GDL with the applied mixture is hot pressed to form the GDE, and wherein the mixture comprises an ionomer, the catalyst dispersion comprises catalyst particles of one or more of: Ag, Pt, Ir, Pd, Ru, Ni, Co, Fe, Pd and their alloys, mixtures, oxides or mixed oxides, and the binder comprises at least one of Teflon, chlorotrifluoroethylene, perfluoroalkoxy alkane (PFA), ethylene tetrafluoroethylene, polyvinylidene fluoride and poly (methyl-methacrylate).

15. The self-refueling power-generating system of claim 13, wherein the metal-based GDE comprises:
a metal-based GDL, and
a mixture comprising a catalyst dispersion and a binder dispersion, applied on the GDL,
wherein the GDL with the applied mixture is hot pressed to form the GDE.

16. A method of configuring a power-generating system to be self-refueling and self-sustaining, wherein the power-generating system comprises:
a reversible device comprising a single stack comprising a plurality of electrochemical cells with respective membrane assemblies, the single stack of the reversible device configured to be operated alternately as a fuel cell in a fuel cell mode and as an electrolyzer in an electrolyzer mode of the stack,
wherein each of the membrane assemblies in the single stack has a hydrogen-side catalyst layer configured to catalyze hydrogen oxidation in the fuel cell mode and to catalyze hydrogen formation in the electrolyzer mode and an oxidant-side catalyst layer configured to catalyze oxygen reduction in the fuel cell mode and to catalyze oxygen formation in the electrolyzer mode, the catalyst layers being separated by a separation layer,
a hydrogen unit configured to supply hydrogen to the reversible device when operated in the fuel cell mode, and receive and optionally compress hydrogen from the reversible device when operated in the electrolyzer mode, and
a power connection configured to receive power from the reversible device when operated in the fuel cell mode, and deliver power to the reversible device when operated in the electrolyzer mode, wherein the power connection is configured to deliver the received power to an external load when required, and to receive power for delivery from an external source when available;
the method comprising:
determining operation of the reversible device in the fuel cell mode or in the electrolyzer mode according to power requirements and power availability,
supplying oxygen to the reversible device in a closed circuit, by supplying oxygen to the reversible device when operated in the fuel cell mode, and receiving and compressing oxygen from the reversible device when operated in the electrolyzer mode, and
supplying water or dilute alkaline electrolyte to the reversible device in a closed circuit, by supplying and receiving water or dilute alkaline electrolyte in conjunction with the closed oxygen supply circuit by separating oxygen produced by the reversible device in the electrolyzer mode from the water or dilute alkaline electrolyte received from the reversible device,
wherein the water is supplied to and removed from the oxygen-side catalyst layer, together with the oxygen.

17. The method of claim 16, wherein the single stack is a single bifunctional stack comprising at least three electrochemical cells with respective membrane assemblies configured to have the catalyst layers and the separation layer embedded in continuous polymerized ionomer material, and further comprising optimizing the hydrogen-side catalyst layer and the oxidant-side catalyst layer to operate in both the fuel cell mode and the electrolyzer mode of the stack according to specified requirements.

18. The method of claim 17, further comprising configuring the separation layer to comprise at least one of:

at least one layer that includes surface-charged particles that have a surface excess of charges, imparting ion conductivity along that surface when hydrated, wherein the surface-charged particles comprise at least one of: charged clay particles, charged ceramic particles, graphene oxide particles, reduced or partially reduced graphene oxide particles and surface-charged polymer particles, and/or at least one protective layer adjacent to a respective one of the catalyst layers, to prevent dehydration thereof and/or exposure thereof to excessively oxidating and/or reducing conditions.

19. A self-refueling power-generating system comprising a reversible device that comprises a single stack that is operable in a fuel cell mode and in an electrolyzer mode, wherein:

hydrogen and oxygen are supplied and received from the reversible device in respective hydrogen and oxygen closed circuits, and are compressed by respective compressors in respective containers in the electrolyzer mode, and dilute alkaline electrolyte is supplied and received from the reversible device in a closed circuit that is in conjunction with the oxygen closed circuit, wherein the oxygen received from the reversible device is separated from the dilute alkaline electrolyte in a gas/liquid separation module, wherein single stack of the reversible device comprises single layered solid state polymer membrane assemblies.

* * * * *